US009083452B2

United States Patent
Nadakuduti et al.

(10) Patent No.: US 9,083,452 B2
(45) Date of Patent: Jul. 14, 2015

(54) NEAR-FIELD EQUIVALENT SOURCE REPRESENTATION FOR SAR ESTIMATION

(71) Applicant: QUALCOMM Incorporated, San Diego, CA (US)

(72) Inventors: Jagadish Nadakuduti, La Jolla, CA (US); Lin Lu, San Diego, CA (US); Paul Guckian, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 232 days.

(21) Appl. No.: 13/801,328

(22) Filed: Mar. 13, 2013

(65) Prior Publication Data

US 2014/0273819 A1    Sep. 18, 2014

(51) Int. Cl.
*H04B 5/00* (2006.01)
*H04B 17/00* (2015.01)
*H04B 1/3827* (2015.01)
*H04B 17/10* (2015.01)

(52) U.S. Cl.
CPC .......... *H04B 17/0032* (2013.01); *H04B 1/3838* (2013.01); *H04B 5/0025* (2013.01); *H04B 5/0043* (2013.01); *H04B 17/102* (2015.01)

(58) Field of Classification Search
CPC ......................... H04B 17/0032; H04B 1/3838
USPC ....................................................... 455/41.1
See application file for complete search history.

(56) References Cited

U.S. PATENT DOCUMENTS

2012/0142291 A1    6/2012    Rath et al.

FOREIGN PATENT DOCUMENTS

WO    2011111049 A1    9/2011

OTHER PUBLICATIONS

"Evaluation of SAR in a human body model due to wireless power transmission in the 10 MHz band" Physical Medical Biology, Aug. 7, 2012; 57 (15) 4991-5002 Laakso et al.*
Carpenter D., "Calculating SAR and Temperature Change in Human Tissue Using the FDTD Method," 5 Pages.
Lopez P.F., et al., "A Radiated Emission Model Compatible to a Commercial Electromagnetic Simulation Tool," Proceedings, 20th Int. Zurich Symposium on EMC, Zurich 2009, pp. 369-372.
Nishizawa S., et al., "Numerical Study on an Equivalent Source Model for Inhomogeneous Magnetic Field Dosimetry in the Low-Frequency Range," IEEE Transactions on Biomedical Engineering, Apr. 2004, vol. 51 (4), pp. 612-616.
Vives-Gilabert Y., et al., "Modeling Magnetic Radiations of Electronic Circuits Using Near-Field Scanning Method," IEEE Transactions on Electromagnetic Compatibility, 2007, vol. 49 (2), pp. 391-400.

* cited by examiner

*Primary Examiner* — David Bilodeau
(74) *Attorney, Agent, or Firm* — Fountainhead Law Group P.C.

(57) ABSTRACT

Efficient techniques for estimating specific absorption rate (SAR) for wireless devices. In an aspect, electric and/or magnetic field measurements are made over a two-dimensional (2D) surface in the proximity of a wireless device. The field measurements are used to generate a near-field equivalent source representation of the wireless device. Specific absorption rate over, e.g., a 1 g/10 g mass may then be calculated by performing electromagnetic simulations using the near-field equivalent source representation. In an aspect, an elementary dipole array may be used to generate the near-field equivalent source representation from the field measurements.

20 Claims, 16 Drawing Sheets

NEAR-FIELD EQUIVALENT SOURCE REPRESENTATION FOR SAR ESTIMATION

BACKGROUND

1. Field

The invention relates to techniques for obtaining a near-field equivalent source (NFES) representation of wireless devices for determining specific absorption rate (SAR).

2. Background

Modern wireless devices such as cellular phones are generally required to meet radio frequency (RF) exposure requirements as mandated by domestic and international standards and regulations. To ensure compliance, such devices must currently undergo an extensive certification process prior to being shipped to market. The certification process may entail performing a large number (e.g., thousands) of measurements on each device to determine the RF exposure of the device under different operating scenarios.

For example, to assess a parameter known as specific absorption rate (SAR) at various positions relative to the wireless device, SAR measurements may be performed over a two-dimensional (2D) surface covering the device for a given operating scenario. Subsequently, three-dimensional (3D) volume SAR scans may be performed at specific locations identified on the surface scan that correspond to high SAR. In an alternative scheme, electromagnetic simulations may be performed by attempting to model the detailed physical characteristics of the wireless device. However, it is often difficult to obtain an accurate physical model for the wireless device in such cases. Furthermore, implementing the aforementioned schemes may consume a great deal of time, and may thus be impractical for state-of-the-art wireless devices that operate over a wide range of bands, number of transmitters, channels, etc.

It would be desirable to provide techniques for efficiently assessing the SAR of wireless devices to reduce the time and cost of design and certification.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The detailed description set forth below in connection with the appended drawings is intended as a description of exemplary aspects of the invention and is not intended to represent the only exemplary aspects in which the invention can be practiced. The term "exemplary" used throughout this description means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein. In this specification and in the claims, the terms "module" and "block" may be used interchangeably to denote an entity configured to perform the operations described.

Figure 1:
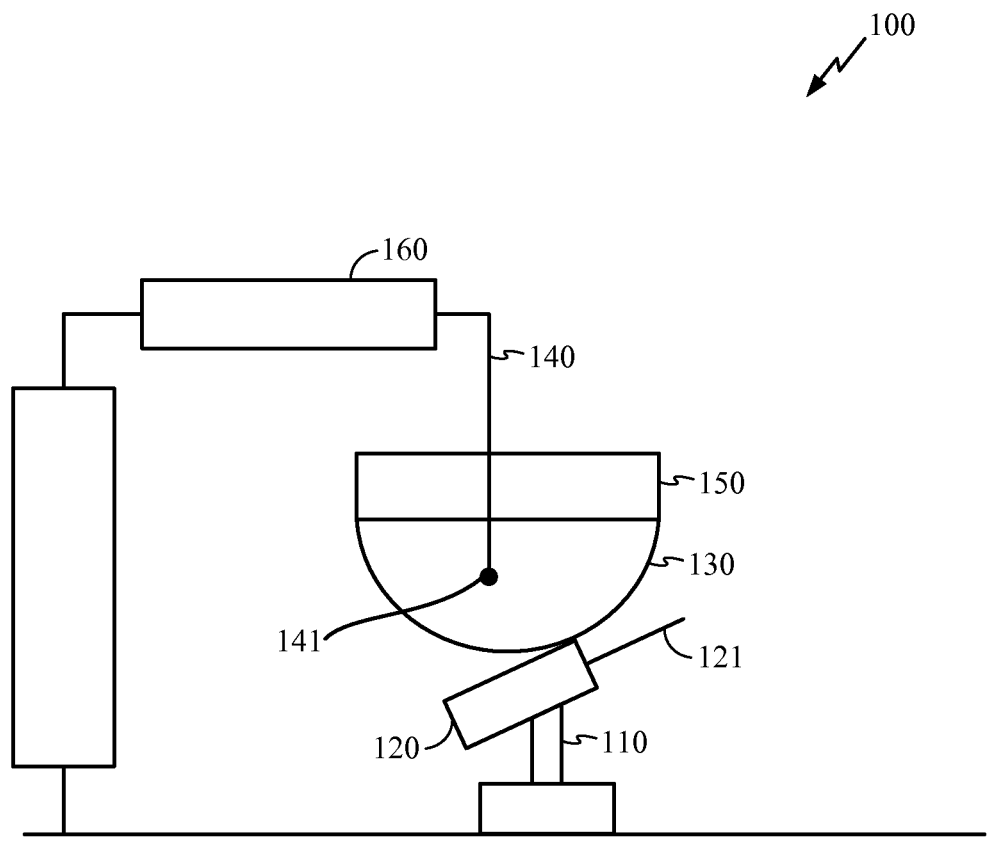
FIG. 1 illustrates a prior art implementation of a test set-up for assessing SAR compliance for a given wireless device.

Various radio frequency (RF) exposure standards and regulations for wireless devices require determining a parameter known as specific absorption rate (SAR) for a wireless device across specific operating scenarios. In the prior art, compliance testing of wireless devices may be performed, e.g., in a test laboratory, prior to shipment of the wireless device as a consumer product. Such compliance testing may be done as part of a certification process. FIG. 1 illustrates a prior art implementation of a test set-up 100 for assessing SAR compliance for a given wireless device. Note FIG. 1 is shown for illustrative purposes only, and is not meant to limit the scope of the present disclosure in any manner.

In FIG. 1, a wireless device 120 (or "WD") having an antenna 121 is supported by a support fixture 110. Note the antenna 121 is shown for illustrative purposes only, and is not meant to limit the scope of the present disclosure to any particular configuration shown. For example, in certain alternative implementations, a wireless device may include multiple antennas, and any antenna may be integrated internally within the body of the device.

A body phantom 150 containing a tissue-simulating liquid 130 having dielectric properties simulating a body part of interest (e.g., a head portion of the body) is provided adjacent to the wireless device 120. A maneuverable robotic positioner 160 further supports a field probe 140, whose terminal end 141 (and/or other points on the field probe 140) contains field sensors for measuring RF emissions, e.g., electric field (E-field or E) and/or magnetic field (H-field or H). By moving the robotic positioner 160 over a spatial range of interest in the proximity of the wireless device 120, the field probe 140 may measure the RF exposure of the wireless device 120 over such range. The support fixture 110 may further be configurable to support the wireless device 120 in a plurality of positions for measuring SAR corresponding to such positions.

Figure 2:
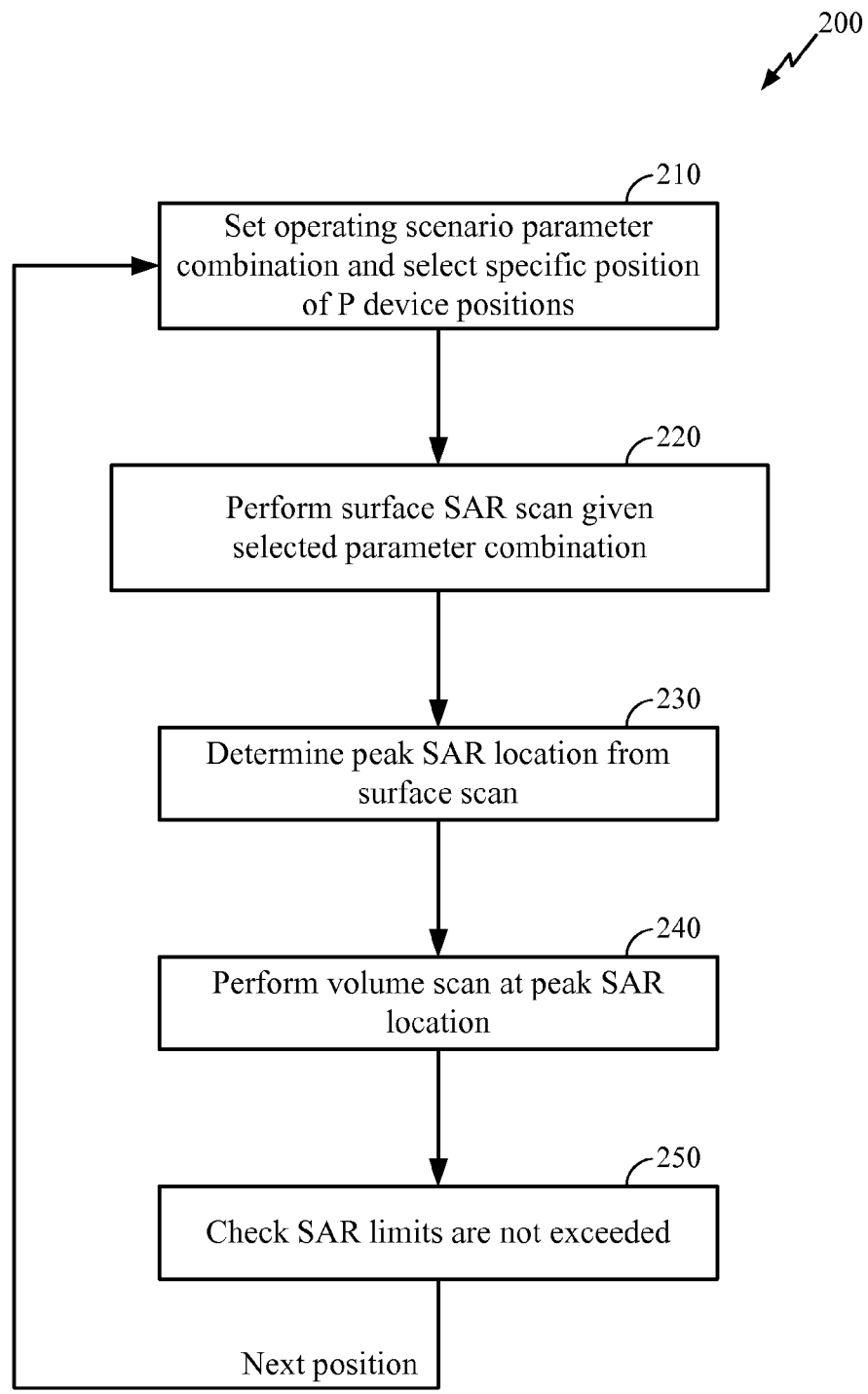
FIG. 2 illustrates an example of a prior art method for testing a WD for SAR compliance.

FIG. 2 illustrates an example of a prior art method 200 for testing a WD for SAR compliance. Note FIG. 2 is shown for illustrative purposes only, and is not meant to limit the scope of the present disclosure.

In FIG. 2, at block 210, a parameter combination for an operating scenario is selected and enabled for the WD. For example, the parameter combination may specify a particular band, channel, technology, number of enabled transmitters or antennas, etc., for the WD. Note in general, a single transmission path may employ multiple antennas, which need not all be active at any time. Further at block 210, a specific position for the SAR measurement relative to the WD is specified. For example, the position may be selected from a number P of possible positions, and may specify, e.g., whether the position of the WD relative to the body is to the left or right, whether the WD is pressed against the cheek or tilted, whether the WD is adjacent to the head or body, etc.

At block 220, a surface (two-dimensional or 2D point) SAR scan is performed using the field probe 140, given the specific parameter combination and position selected at block 210. For example, the field probe 140 may be swept over a pre-defined 2D surface using the maneuverable robotic positioner 160.

At block 230, the location on the surface SAR scan corresponding to the peak SAR is identified.

At block 240, a volume (three-dimensional or 3D) SAR scan surrounding the identified peak location is performed. For example, the volume scan may be an SAR scan around the peak location determined at block 230, performed at a higher spatial resolution than the surface SAR scan performed at block 220.

At block 250, based on the volume scan, it is checked whether the SAR limits are exceeded.

Following block 250, the method 200 may return to block 210 to iterate through the remaining position(s) not tested. Note in alternative implementations, iterations may further be performed over other parameter combinations, e.g., other band(s), channel(s), technologies, etc., to determine compliance of the WD with SAR requirements over all possible operating scenarios.

In a typical certification process, a large number of measurements may need to be performed using the test set-up 100 and the method 200 prior to shipping the product to market. For example, current specific absorption rate (SAR) certification of wireless devices requires rigorous testing to demonstrate that the WD meets the requirements for various radio access technologies (RAT), including simultaneous RF emissions by multiple transmitters/antennas in a single device. For wireless devices supporting multiple transmitters, bands, channels, etc., it would be required to determine SAR parameters for many operating scenarios. Furthermore, the measured SAR depends on the specific position relative to the wireless device 120, as well as the characteristics of the medium (e.g., tissue-simulating liquid) present between the device and the probe.

It would be desirable to provide techniques for reducing the time and number of measurements required to measure SAR for a wireless device, both to assist in the design of the device and for SAR compliance testing. To this end, certain prior art techniques estimate SAR using electromagnetic simulations modeling the physical characteristics of a WD. However, it will be appreciated that modeling the physical characteristics of a WD may be technically difficult due to discontinuities introduced by the mechanical structure, different material make-up, and various components of the WD. Therefore, such electromagnetic simulations typically generate SAR predictions that fail to accurately correlate with actual SAR measurements.

The present disclosure describes efficient techniques for representing a wireless device (WD) as a near-field equivalent source for estimating specific absorption rate (SAR). The near-field equivalent source representation effectively allows prediction of SAR variation within low-, mid-, and high-channels of a given band. Per techniques of the present disclosure, 2D measurements are performed around the WD to capture the H-fields or E-fields emitted from an actual device. Based on the 2D measurements, an equivalent source may be constructed accurately representing the actual WD, thus allowing accurate prediction of SAR variation accounting for the discontinuities mentioned above. Furthermore, SAR variations due to device position relative to the body may be determined by performing electromagnetic simulations using the near-field equivalent source representation. The disclosed techniques eliminate the need to electromagnetically model the individual components of the WD.

Per the techniques of the present disclosure, electric or magnetic field measurements are made over a two-dimensional (2D) plane relative to the WD, recording both the magnitude and the phase of the electric or magnetic field at a desired transmitting frequency. In an exemplary embodiment, the measurements may be conducted in free-space (rather than through, e.g., a tissue-simulating liquid). The electric or magnetic field measurements are then used to derive a near-field equivalent source representation of the WD using techniques known in the art. Once the representation is derived, electromagnetic simulations may be performed using a computer to obtain SAR estimates for all device positions of interest, by placing the near-field equivalent source representation as a source next to a standard anthropomorphic model (SAM)/body phantom in the simulation.

In this manner, since position-dependent SAR distributions and estimates may be obtained from the near-field equivalent source representation using computer electromagnetic simulations, SAR measurements need not initially be performed for each possible body position. Furthermore, the difficulties associated with electromagnetic modeling of the physical components of a WD are avoided. It will be appreciated that the approach described herein advantageously reduces the required measurement time for determining compliance with both design requirements and regulatory certification.

Figure 3:
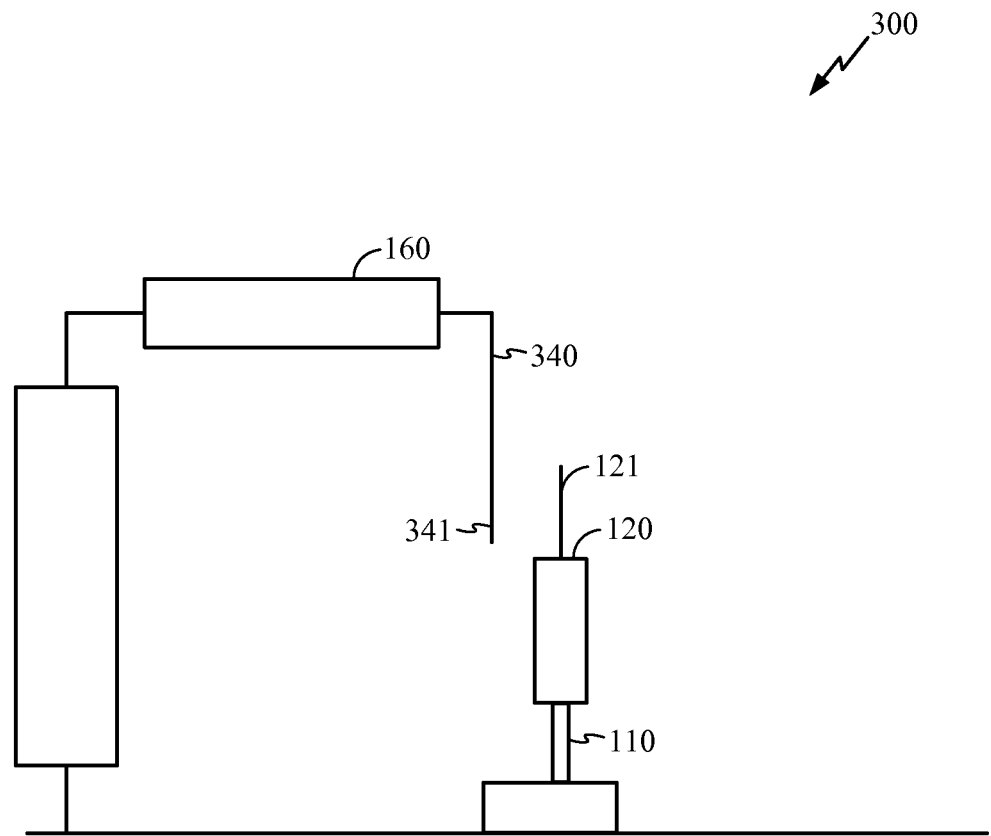
FIG. 3 illustrates an exemplary embodiment of a test set-up for assessing SAR compliance according to the present disclosure.

FIG. 3 illustrates an exemplary embodiment of a test set-up 300 for assessing SAR compliance according to the present disclosure. Note FIG. 3 is shown for illustrative purposes only, and is not meant to limit the scope of the present disclosure in any manner. Similarly labeled elements in FIGS. 1 and 3 may correspond to elements having similar functionality, unless otherwise noted.

In FIG. 3, field sensors near the terminal end 341 of the field probe 340 directly measure field, e.g., electric field and/or magnetic field, received from the WD 120 over free space. In an exemplary embodiment, the field probe 340 may measure and record both magnitude and phase, or only magnitude, of each component of the field. (Note the probe sensor 141 of FIG. 1 may only be required to measure the total field magnitude.) For example, measuring and recording the X- and Y-components of the H-field (wherein the X- and Y-axes are defined as being along the surface of the WD facing the probe 340, and the Z-axis is along the depth/thickness of the WD) may advantageously simply the inverse problem calculation in determining the near-field equivalent source. In alternative exemplary embodiments, any two components (e.g., X- and Z-components, Y- and Z-components) of the three components of the H- (or E-) field may be utilized according to the present disclosure. In yet alternative exemplary embodiments, any one component of the three components may be utilized to derive the near-field equivalent source, and all such alternative exemplary embodiments are contemplated to be within the scope of the present disclosure.

Note the measurements by the field probe 340 may be conducted in free space, i.e., no tissue-simulating liquid 130 need be provided between the wireless device 120 and the field probe 340. In an exemplary embodiment, the support fixture 110 need not be configurable to place the wireless device 120 in a plurality of positions, and maneuverability of the robotic positioner 160 may be sufficient for obtaining the requisite 2D field scans of the device.

Figure 4:
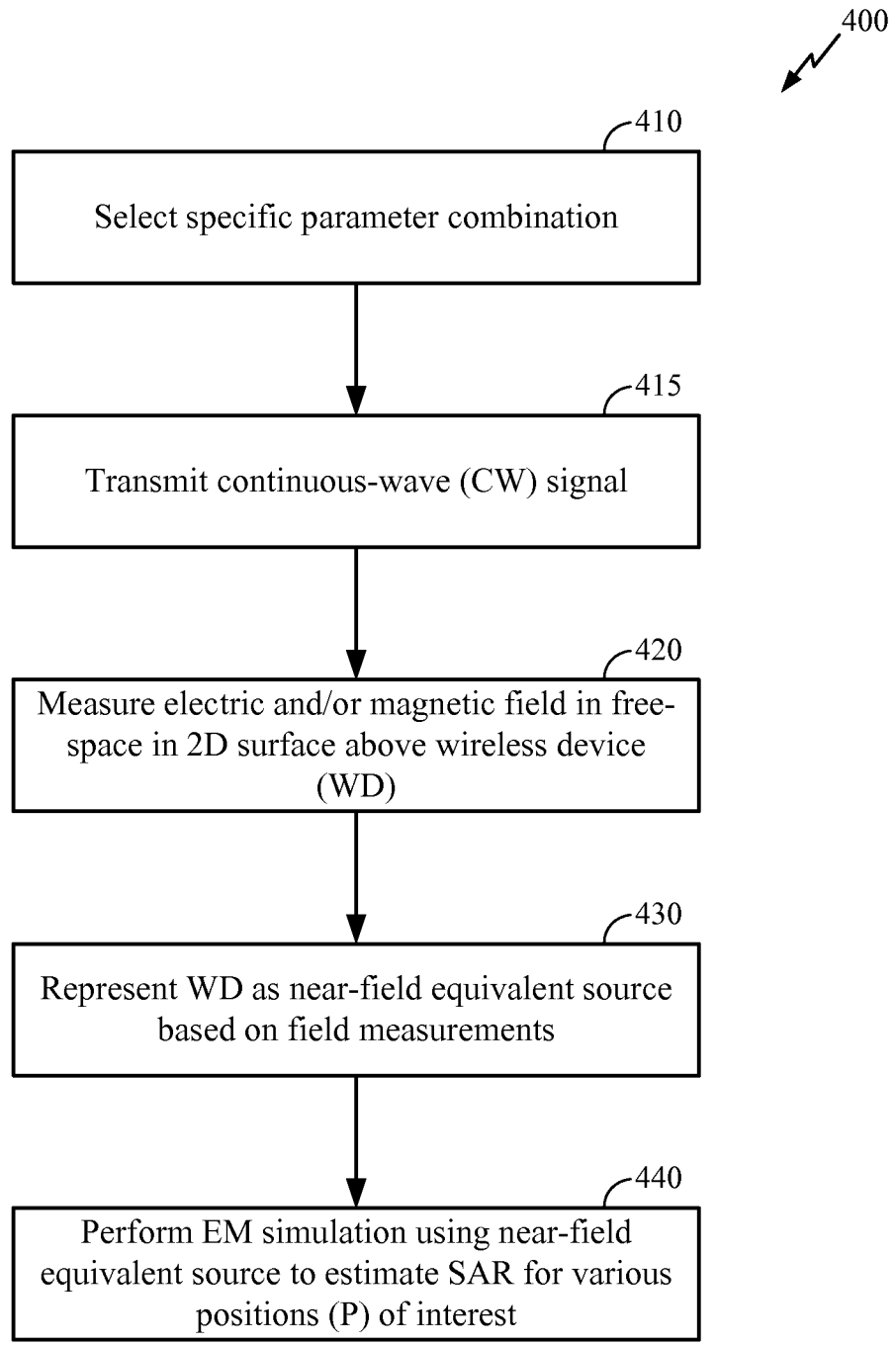
FIG. 4 illustrates an exemplary embodiment of a method according to the present disclosure.

FIG. 4 illustrates an exemplary embodiment 400 of a method according to the present disclosure. Note FIG. 4 is shown for illustrative purposes only, and is not meant to limit the scope of the present disclosure.

In FIG. 4, at block 410, a specific parameter combination is selected for the WD. In an exemplary embodiment, the parameters may include the specification of a single active transmitter, a single antenna, a band, and a channel.

At block 415, the transmitter specified in the parameter combination is configured to transmit a continuous-wave (CW) signal at the specified channel frequency. It will be appreciated that doing so facilitates subsequent measurement of the magnitude and phase of electric and magnetic fields over the 2D surface for deriving the near-field equivalent source. In an exemplary embodiment, the CW signal may correspond to a single-tone sinusoidal wave (i.e., an unmodulated signal) that is scaled in power to match the power levels expected of the technology specified for an operating scenario, e.g., WCDMA, LTE, etc.

At block 420, the magnitude and/or phase of electric and/or magnetic field is measured in free-space over a pre-defined two-dimensional (2D) surface above the wireless device (WD) given the specific parameter combination. In this specification and in the claims, the designation of a surface as being "above" a WD may denote that such surface is in the direction of the location that would correspond to the body phantom 150 relative to the WD. It will be appreciated that it is preferable to measure the field over such surface above the WD, as the fields on that side will predominantly influence the SAR. For illustration, the surface above the WD may be designated to be in the direction of the surface labeled 520a in the spatial model 500, further described hereinbelow with reference to FIG. 5.

The parameters of the 2D surface, e.g., the shape, size, position relative to the WD, etc., may be pre-selected. For example, the size of the 2D surface may cover the entire body of the wireless device, while the shape of the surface can be arbitrarily selected. In an exemplary embodiment, the test set-up 300 of FIG. 3 may be utilized to perform the field measurements over the 2D surface. In an exemplary embodiment, the surface may be, e.g., a cylindrical surface surrounding the WD. To accommodate such an exemplary embodiment, it will be appreciated that, as shown in FIG. 3, the test set-up 300 may place the device 120 vertically on the support fixture 110, and the probe 340 may perform the scan around the device 120. It will be appreciated that the measurement surface may be placed in the proximity of the WD for better accuracy of the derived near-field equivalent source model.

It will be appreciated that performing the measurements of block 420 in free space affords a conservative estimate (e.g., over-estimate) of SAR during subsequent computation. In particular, antenna performance of the wireless device 120 is expected to be optimum, and thus RF emissions are expected to be at their maximum, in free space. By performing the measurements in free space, the need to provide a tissue-simulating liquid is eliminated, thereby simplifying the testing of the device according to the method 400.

At block 430, given the field measurements obtained at block 420, a near-field equivalent source (NFES) representation may be derived for the WD using techniques known in the art. In an exemplary embodiment, the near-field equivalent source may correspond to an elementary dipole array, whose elemental configuration may be derived from the electric or magnetic field measurements made at block 420. See, e.g., Vives-Gilabert et al., "Modeling magnetic radiations of electronic circuits using near-field scanning method," IEEE Trans. Electromagn. Compat., 49(2):391-400, 2007.

In particular, the WD may be represented as a set of magnetic dipoles radiating approximately the same electric or magnetic field as the WD over the 2D surface, as measured at block 420. Alternatively, the WD may be represented as a set of electric dipoles radiating approximately the same electric or magnetic field as measured at block 420. To derive the elemental configuration parameters of the dipole array, e.g., number of elementary dipoles forming an array, amplitude and orientation of each of those elementary dipoles, etc., various techniques known in the art may be employed. One of ordinary skill in the art will appreciate that such techniques include, but are not limited to, least-mean squares, curve-fitting, optimization algorithms, iterative algorithms, genetic algorithms, etc., any of which may be applied to fit the near-field equivalent source representation parameters to the measured field data. Note that other electromagnetic source reconstruction techniques known in the art, such as using equivalent electric and/or magnetic currents, can also be used to represent the WD as a near-field equivalent source, and the exemplary discussion of representing WD with a set of elementary dipoles is not meant to limit the scope of the present disclosure to any particular techniques described.

At block 440, using the near-field equivalent source representation determined at block 430, electromagnetic simulations are performed using a computer to determine SAR at possible device positions of interest for a given specific parameter combination. Note the computer simulation may model the material properties of an SAM/body phantom, and also account for variations in frequency across different parameter combinations. Consequently, the SAR estimated at the positions of interest at block 440 can be used to determine whether the SAR from the WD meets regulatory requirements.

Figure 5:
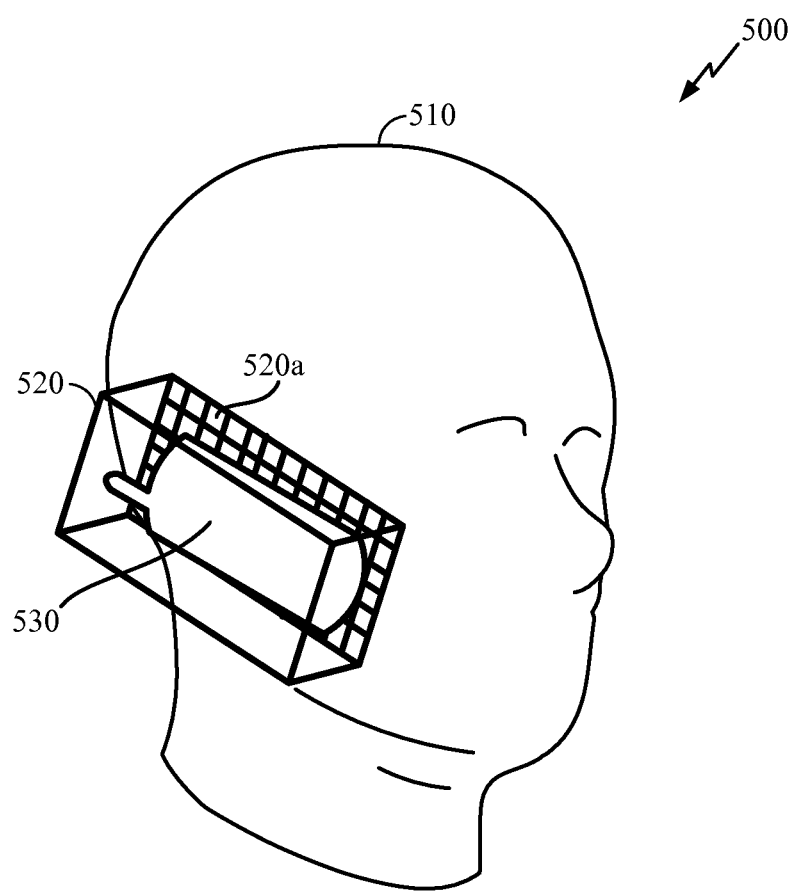
FIG. 5 shows an illustrative spatial model that may be used to perform the SAR estimation described.

FIG. 5 shows an illustrative spatial electromagnetic model 500 that may be used to perform the SAR estimation described. In particular, the wireless device 530 may be modeled as a near-field equivalent source representation as derived from the method 400. The spatial extent of the near-field equivalent source representation may be confined to be within the box 520 in the electromagnetic simulations. Note that the box 520 represented in FIG. 5 is not meant to limit the scope of the present disclosure to any particular shape for the NFES. For example, in alternative exemplary embodiments, the near-field equivalent source may be represented as a bounding plane containing the measured or derived electric or magnetic fields emitted by the wireless device. Given the NFES, the SAR may be estimated across various positions of the body phantom model 510, to quickly and efficiently determine whether the expected SAR meets design and/or regulatory requirements.

In an exemplary embodiment, simulations based on the body positions of interest may be used to derive 2D SAR and/or E-field data inside the tissue-simulating liquid along the SAM/body phantom surface, or 3D volume SAR and/or E-field data inside the tissue-simulating liquid contained in the SAM/body phantom. In an exemplary embodiment, the SAR and/or E-field data may be stored in a memory of the WD for further use. For example, 2D SAR data obtained from electromagnetic simulations using the near-field equivalent source may be stored in a memory of a wireless device, and subsequently used for real-time control of active transmitters' power levels to meet RF exposure requirements, as further described hereinbelow with reference to FIGS. 9-14.

Comparing the measurement set-up 300 with the prior art set-up 100, it will be appreciated that the set-up 300 advantageously contains fewer components, and is thus simpler to implement. In particular, there is no body phantom 150 or tissue-simulating liquid 130 required in the set-up 300. Furthermore, the method 400 affords faster measurement times compared to the prior art method 200, as there is no requirement to change tissue-simulating liquid (which may vary with frequency), since measurements are conducted in free space. The method 400 also does not require re-positioning the WD in various positions, as measurements are simply performed over a single 2D surface relative to the WD, and thus the support fixture 110 may be simpler to construct. This advantageously reduces the uncertainty associated with re-positioning the WD during the measurement procedure.

Figure 6:
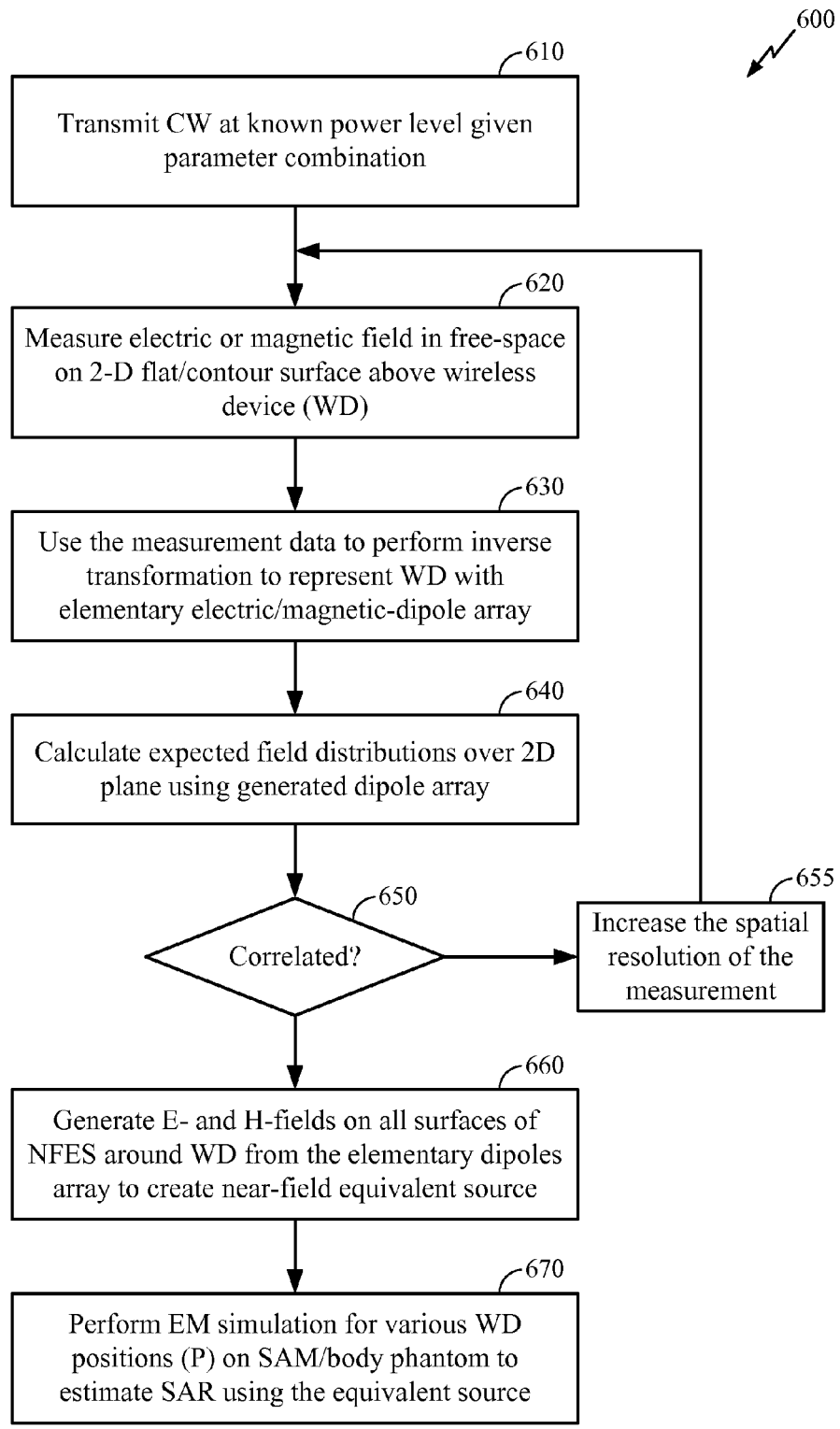
FIG. 6 illustrates a specific exemplary embodiment of operations performed in blocks 410, 415, 420, 430 of FIG. 4.

FIG. 6 illustrates a specific exemplary embodiment 600 of operations performed in blocks 410, 415, 420, 430 of FIG. 4. Note FIG. 6 is shown for illustrative purposes only, and is not meant to limit the scope of the present disclosure to any particular method shown. The operations described with reference to FIG. 6 may constitute a particular sequence of steps for executing the blocks described with reference to FIG. 4, although it will be appreciated that they need not constitute the only sequence that may be derived by one of ordinary skill in the art in light of the present disclosure.

In FIG. 6, at block 610, the transmitter of the wireless device is configured to transmit a continuous-wave (CW) signal at a known power level given a specific parameter combination, e.g., specifying the band, channel, single selected transmitter, and antenna.

At block 620, the amplitude and phase of the electric or magnetic field is measured over a two-dimensional (2D) flat contour surface 520a above the wireless device facing the SAM/body phantom under normal usage conditions. In an exemplary embodiment, the field is measured in free space, without the presence of a tissue-simulating liquid. It will be appreciated that the measurements may be performed using a pre-determined spatial resolution, e.g., the fields may be sampled at a 1-cm-by-1-cm spatial resolution, etc. In an exemplary embodiment, the spatial resolution may be set to an initial value, and subsequently may be adjusted based on the needs of the measurement, e.g., as further described with reference to block 655 hereinbelow.

At block 630, the measurement data obtained at block 620 is used to generate a representation of the wireless device. In particular, an inverse transformation may be performed on the measurement data to represent the wireless data as an array of elementary (or electrically small) electric and/or magnetic dipoles. Such inverse transformation may be performed as described in, e.g., Vives-Gilabert et al., earlier referenced hereinabove. In this specification and in the claims, an elementary dipole may be understood to correspond to a smallest-size representation of a dipole that still describes the behavior of the dipole to an accuracy of interest.

At block 640, the dipole array generated at block 630 is used to calculate the expected field distributions over the 2D surface used to perform the measurements at block 620. One of ordinary skill in the art will appreciate that parameters of the 2D surface will be taken into account when calculating the expected field distributions, e.g., the shape of the 2D surface, its distance from the wireless device, etc.

At block 650, the expected field distributions computed at block 640 are compared with the actual field data obtained at block 620. In an exemplary embodiment, a difference metric may be obtained quantifying the accuracy of the fields computed from the dipole array representation, as compared with the actual data. If the representation is deemed correlated (e.g., sufficiently accurate), then the method proceeds to block 660. If not, then the method proceeds to block 655.

At block 655, the spatial resolution of the field measurement is increased to improve the accuracy of the representation. In alternative exemplary embodiments (not shown), for increased accuracy, the separation distance between measurement plane and WD can also or alternatively be decreased at block 655 so that field measurement at block 620 is performed at closer distances to the surface of the WD. Following block 655, the method returns to blocks 620-650, e.g., to re-derive a dipole array based on the updated spatial resolution and/or separation distance. Note the iterative process described with reference to blocks 620-655 is provided for illustrative purposes only, and is not meant to limit the scope of the present disclosure.

At block 660, electric and magnetic fields on all surfaces of the near-field equivalent source 520 (i.e., not just over the 2D surface), representing the wireless device, are computed from the elementary dipole array representation. It will be appreciated that while a dipole array may be represented according to an element array format (e.g., specifying the parameters of the elementary dipoles), an NFES is represented according to an H- or E-field distribution format. Thus by computing the electric and magnetic fields on all surfaces of a near-field equivalent source 520 using the dipole array, a near-field equivalent source may be fully specified.

In an exemplary embodiment, the elementary dipole array may be used to calculate both electric- and magnetic-fields on all 6 surfaces of the box 520, with the box 520 being denoted as the NFES. However, note the NFES can take on any arbitrary shape as long as it encloses the WD, i.e., known E-/H-fields (or electric and magnetic source currents) on the closed surface enclosing the WD can be used to simulate the electromagnetic behavior of the object inside the surface. Other relevant criteria for defining the NFES representation may include, e.g., the accuracy of the field data and spatial resolution of field data distributed over the NFES surface.

At block 670, electromagnetic (EM) simulations are further performed to estimate SAR for any of various positions relative to the wireless device, given the near-field equivalent source. For example, the spatial model illustrated in FIG. 5 may be utilized, and modified to determine the SAR in the SAM/body phantom at any location of interest relative to the wireless device.

Figure 7:
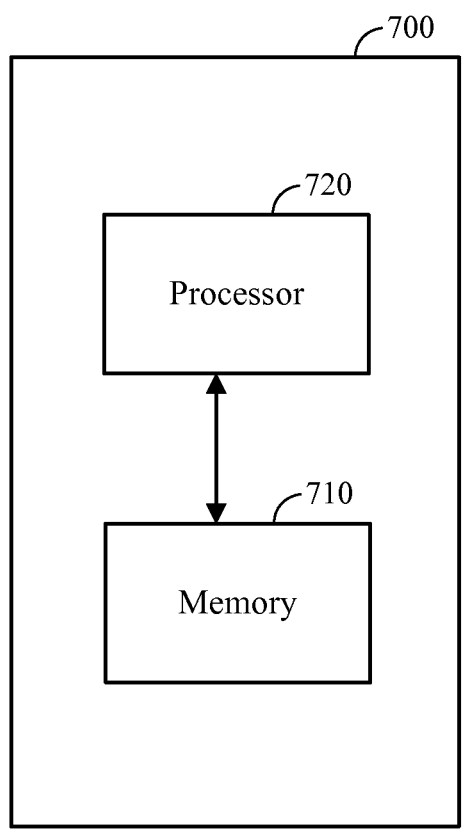
FIG. 7 illustrates an exemplary embodiment of an apparatus according to the present disclosure.

FIG. 7 illustrates an exemplary embodiment of an apparatus 700 according to the present disclosure. Note the apparatus 700 is shown for illustrative purposes only, and is not meant to limit the scope of the present disclosure.

In FIG. 7, a memory 710 stores the magnitudes of at least one component of an electric or magnetic field over a two-dimensional surface in the vicinity of a wireless device. In an exemplary embodiment, such magnitudes may be as measured, e.g., at block 420 of method 400 as described with reference to FIG. 4. A processor 720 is configured to derive a near-field equivalent source representation of the wireless device based on the stored electric or magnetic field components. The processor 720 is further configured to estimate specific absorption rate (SAR) in the SAM/body phantom at a location relative to the wireless device using the derived near-field equivalent source (NFES) representation, e.g., by performing electromagnetic simulations.

In an exemplary embodiment, the memory 710 may further store the phase components of the at least one component of the electric or magnetic field over the two-dimensional surface. Note the processor 720 may correspond to, e.g., a processor configured to work with any type of computer, e.g., a desktop computer, workstation, etc., that is capable of performing the simulations described.

Figure 8:
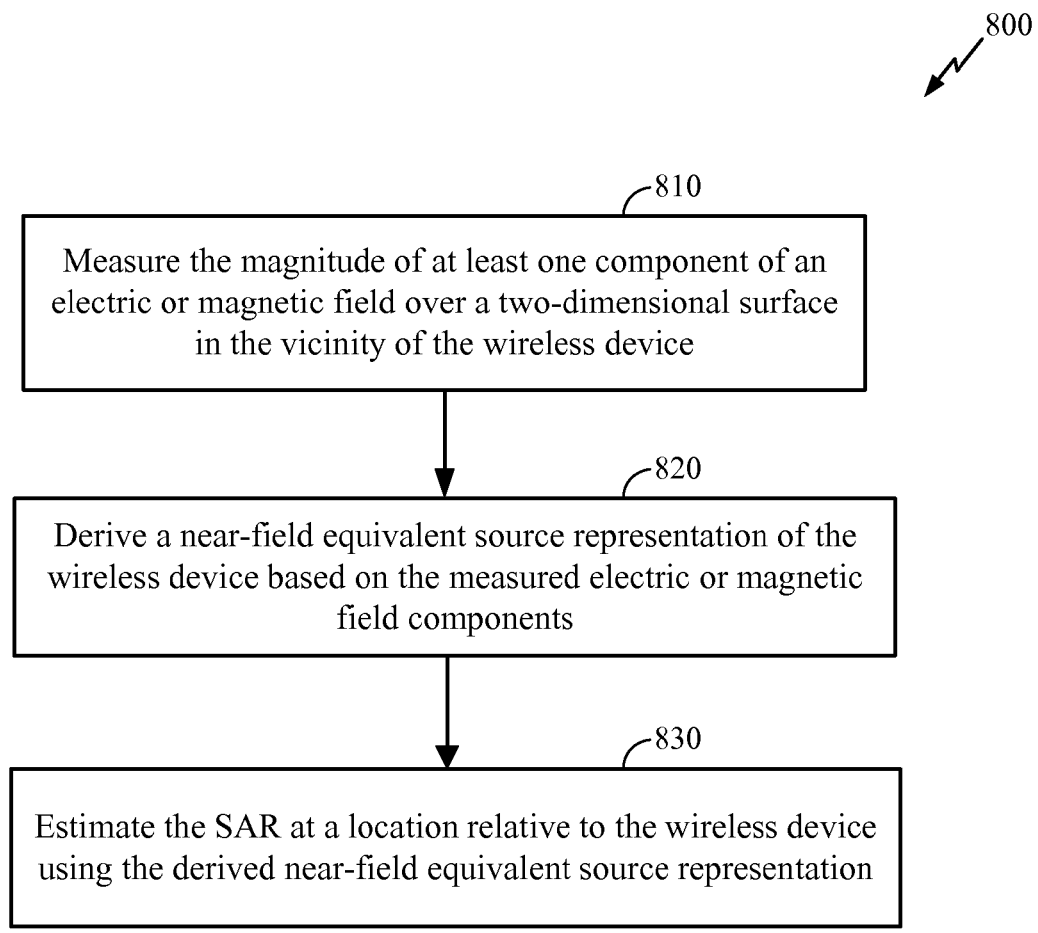
FIG. 8 illustrates an alternative exemplary embodiment 800 of a method according to the present disclosure.
Figure 9:
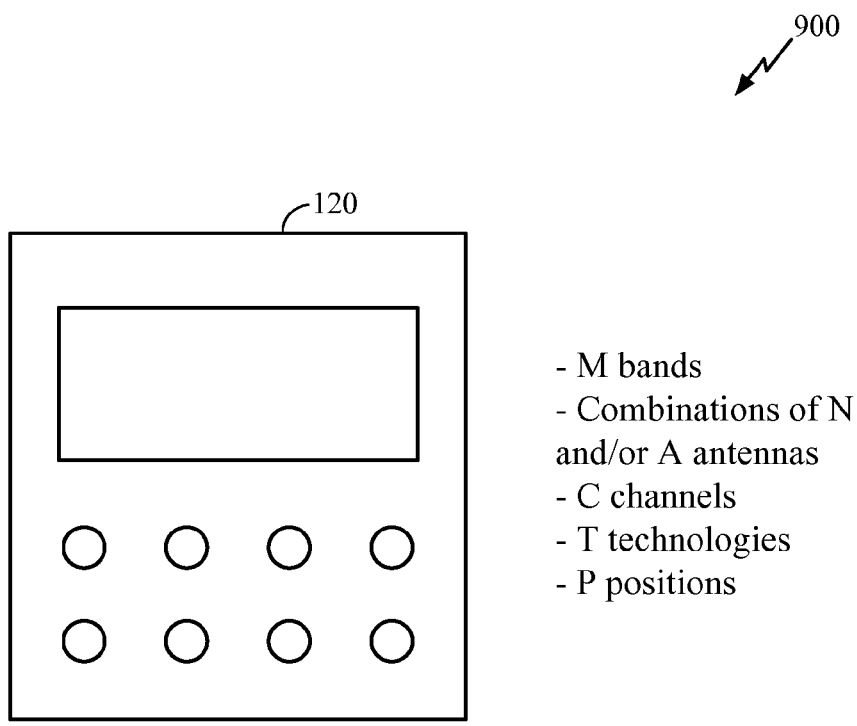
FIG. 9 illustrates a representation of the necessary iterations for testing a wireless device according to state-of-the-art certification processes.

FIG. 8 illustrates an alternative exemplary embodiment 800 of a method according to the present disclosure. In FIG. 8, at block 810, the magnitude of at least one component of an electric or magnetic field is measured over a two-dimensional surface in the vicinity of the wireless device. At block 820, a near-field equivalent source representation of the wireless device is derived based on the measured electric or magnetic field components. At block 830, the SAR at a location relative to the wireless device is estimated using the derived near-field equivalent source representation.

In an alternative aspect of the present disclosure, with reference to FIGS. 9-14 hereinbelow, techniques are provided for real-time determination of SAR. Note the description of FIGS. 9-14 hereinbelow is provided for illustrative purposes only, and is not meant to limit the scope of the present disclosure to exemplary embodiments that necessarily incorporate the features described with reference to FIGS. 9-14. In particular, the techniques described hereinabove with reference to FIGS. 1-8 may generally be practiced independently of the features described hereinbelow with reference to FIGS. 9-14, unless otherwise explicitly noted.

In a typical certification process, it may be required to perform a large number of measurements using the test set-up 100, e.g., on a prototype device, prior to mass production and shipment of the product to market. For example, a state-of-the-art testing process may require exhaustive SAR measurements to be performed and evaluated for each possible operating scenario of a wireless device, e.g., across different combinations of M modes and/or bands, possible combinations of N transmitters, A antennas, C channels, T technologies, and P device positions relative to the body phantom 150, as shown by illustration 900 of FIG. 9. Note in this specification, the variables M, N, A, C, T, and P may each correspond to the total number quantity of the corresponding item. Furthermore, as further described in detail hereinbelow, the number of possible operating parameter combinations for each device increases according to the number of transmitters, antennas, and/or operating bands for each device.

Figure 10:
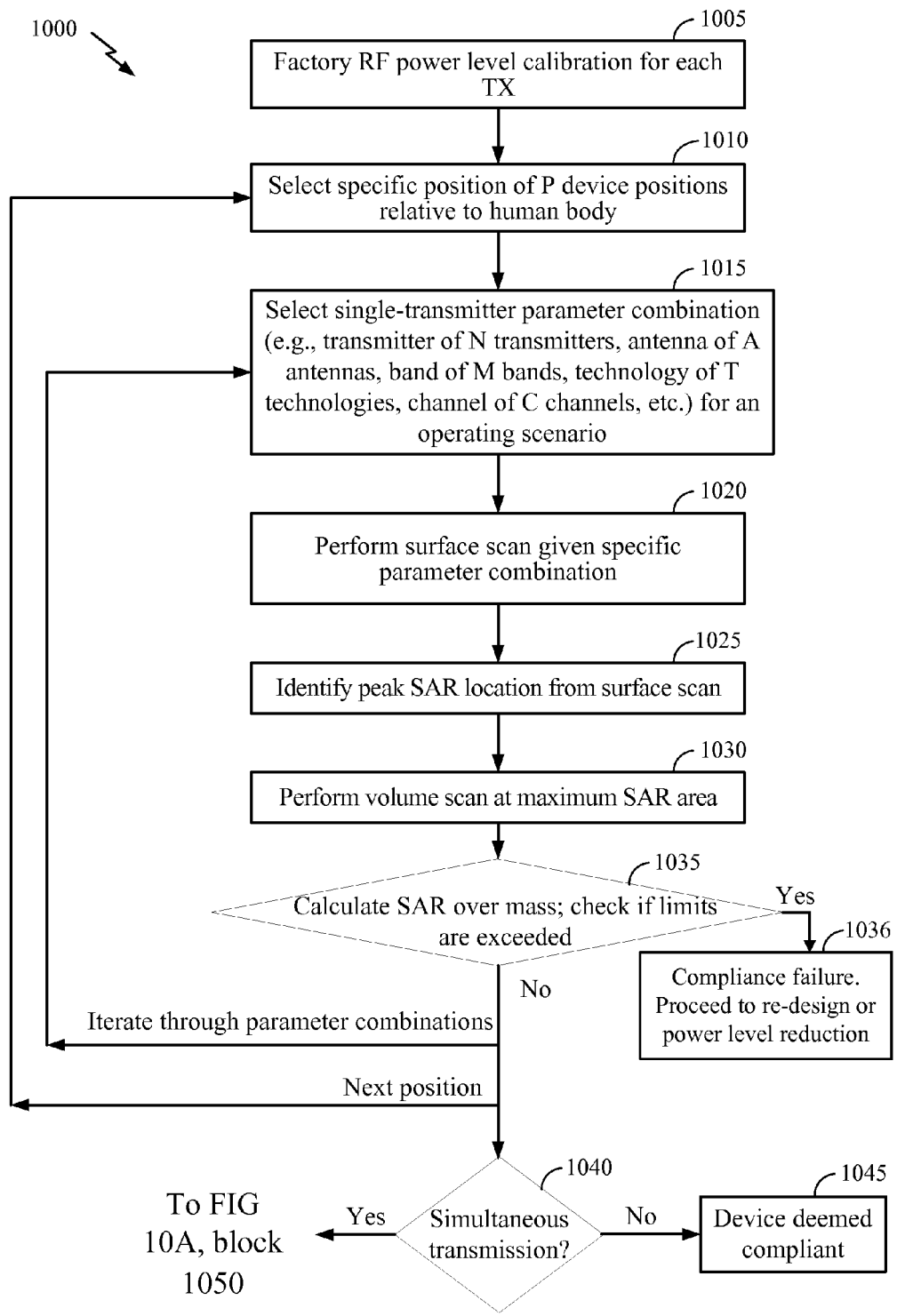
FIGS. 10 and 10A illustrate an example of a prior art method for testing a wireless device for SAR compliance, including assessing SAR for simultaneous transmission across all supported combinations of transmitters and antennas.

FIG. 10 illustrates an example of a prior art method 1000 for testing a wireless device 120 for SAR compliance, including assessing SAR for simultaneous transmission across all supported combinations of transmitters and antennas. Note FIG. 10 is shown for illustrative purposes only, and is not meant to limit the application of the techniques of the present disclosure to any particular system shown.

In FIG. 10, at block 1005, factory RF calibration is performed to determine the nominal maximum transmit power levels of the wireless device prior to certification testing. For example, during RF calibration, each transmitter of the wireless device may be set to transmit at its maximum level, and the actual power level corresponding to such maximum transmission may be measured and recorded.

At block 1010, a specific position (e.g., right vs. left, cheek vs. tilt, head vs. body) for testing is selected from a total number P of possible device positions relative to a human body. As illustrated in FIG. 1 for the illustrative test set-up 100, the designation of a specific body position may specify the position, e.g., orientation and relative position, of the mobile device 120 relative to the probe 140.

At block 1015, a single-transmitter parameter combination for a specific operating scenario is selected and enabled for the wireless device. Note in this specification and in the claims, unless otherwise noted, the term "combination" may denote a "parameter combination," i.e., specifying a particular combination of parameters corresponding to an operating scenario of the wireless device. In particular, the single-transmitter parameter combination may specify a single active transmitter (out of N possible transmitters), an active antenna (out of A possible antennas), a specific band (out of M supported bands), a specific technology (e.g., WCDMA, LTE, etc.) selected from a total number T of technologies, etc. It will be appreciated that the number of bands, active transmitters, etc., may all be different depending on each technology.

The parameter combination may also specify a specific channel, e.g., frequency channel within a band, selected from a total number C of channels in each band. The total number C may also include low-, mid-, and high-channels within the selected band. Note in some systems, the definition of a "channel," as well as the value of C, may be different depending on technology. For example, in an LTE system, C may include not only the number of channels in each band, but also the number of resource block (RB) configurations that need to be evaluated.

Note the specific parameters (e.g., transmitters, antennas, bands, technologies, channels, etc.) enumerated herein with reference to FIGS. 10, 10A, 11, 12, and 12A are given for illustrative purposes only, and are not meant to limit the scope of the present disclosure to any parameter combinations necessarily including all or any of the parameters listed. For example, in certain alternative implementations, parameter combinations may omit one or more of the parameters mentioned, or may specify other parameters in addition to those specifically enumerated. Such alternative types of parameter combinations are contemplated to be within the scope of the present disclosure.

At block 1020, a surface SAR scan (e.g., two-dimensional or "2D" point-SAR scan) is performed, given the selected parameter combination set at blocks 1010 and 1015. In an implementation, the surface SAR scan may be performed by sweeping the probe 140 over a predetermined two-dimensional (2D) surface, and measuring the SAR corresponding to points on the 2D surface according to a pre-specified spatial resolution. The 2D surface may be defined according to any convention known in the art, e.g., a surface may be defined having constant or variable distances from a point or points on the wireless device 120.

At block 1025, one or more peak SAR locations may be identified from the 2D surface scan performed at block 1020.

At block 1030, a volume (three-dimensional or 3D) SAR scan is performed surrounding the identified peak location(s). A volume scan provides more detail of the local SAR surrounding the peak location(s) than is available from the 2D surface scan performed at block 1020. Compared to the surface scan, it may be relatively more time-intensive to perform the volume scan.

At block 1035, based on the volume scan(s), the SAR value over a mass, e.g., 1 g or 10 g, is calculated. Furthermore, it is checked whether the calculated SAR exceeds the prescribed limits. If the limits are not exceeded, then the method 1000 proceeds to further iteration as further described hereinbelow. If the limits are exceeded, then compliance failure may be declared at block 1036. Note in response to declaring compliance failure, the method 1000 may call for re-design of the wireless device to ensure SAR compliance. Alternatively, the maximum power level of the selected transmitter may be reduced to a lower level and/or recorded in a memory, and the SAR may be re-evaluated at the reduced maximum transmitted power level, e.g., at blocks 1020 through 1035.

Following block 1035, if SAR limits are not exceeded, then the method 1000 may return to block 1015 to iterate through the remaining combinations not tested, e.g., proceeding to the next combination of transmitter, band, technology, channel, etc. The method 1000 may further return to block 1010 to iterate through positions not tested.

Following iterations through all combinations and positions, it is assumed that the check at block 1035 has passed for iterations over all combinations, and the device is deemed to be in compliance with SAR requirements at the maximum operating transmitting powers of all transmitters tested individually. In particular, as only individual transmitters are selected for each combination at block 1015, only measurements corresponding to individual active transmitters are performed for iterations through blocks 1010-1035 described hereinabove. Following determination of compliance for transmitters individually, it is then determined whether compliance is also met if/when multiple transmitters are simultaneously active.

Accordingly, at block 1040, it is checked whether simultaneous transmission, e.g., by multiple transmitters, is called for by the design of the wireless device, e.g., based on device capability. If no, then the method proceeds to block 1045, wherein the device is deemed compliant. If yes, i.e., simultaneous transmission by multiple active transmitters is called for by the device, then the method proceeds to block 1050 of FIG. 10A, showing the continuation of the method 1000.

Figure 10A:
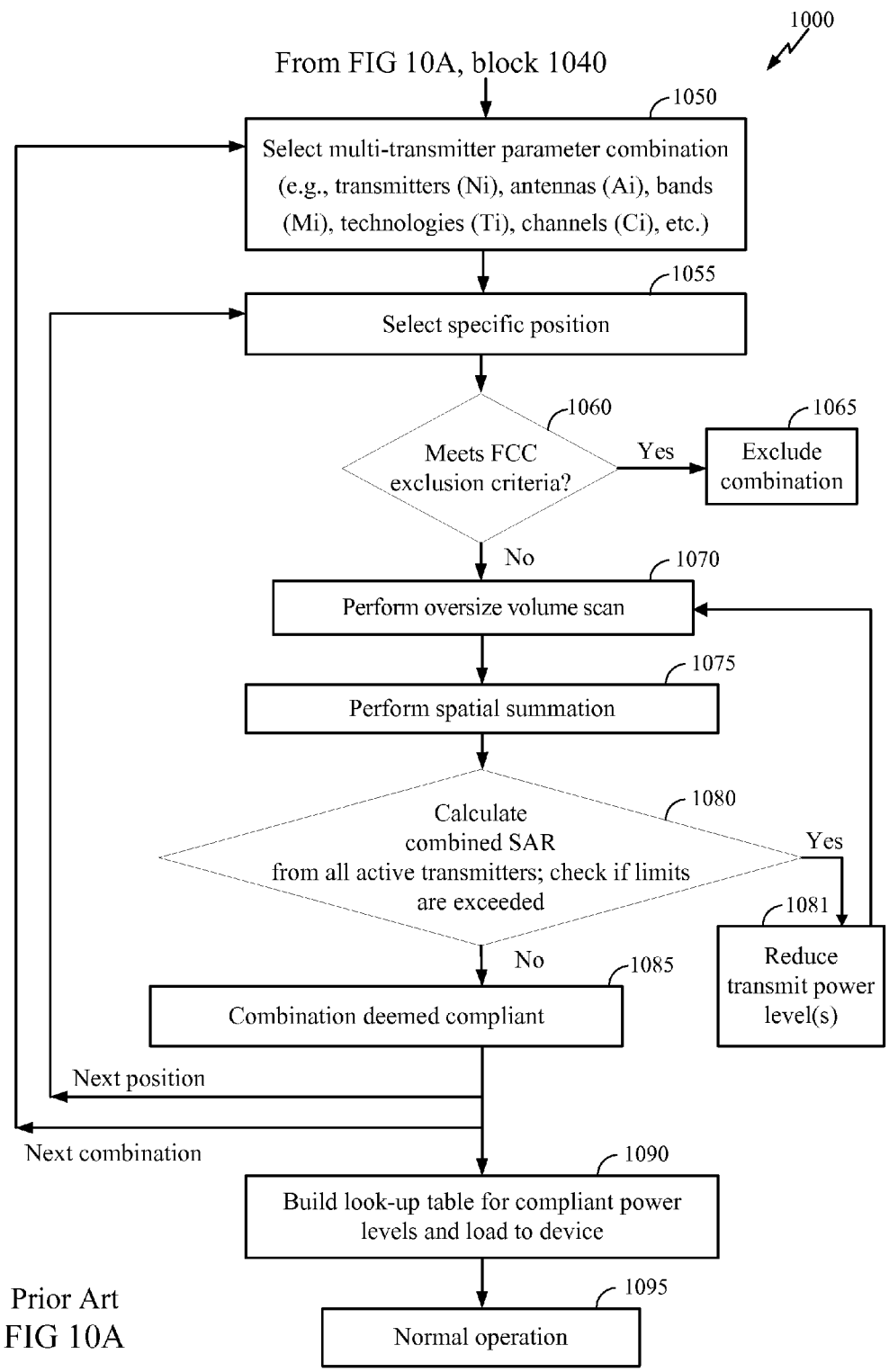

In FIG. 10A, at block 1050, a specific multi-transmitter parameter combination for the wireless device is specified. The multi-transmitter parameter combination may specify parameters for an operating scenario wherein multiple devices are simultaneously active, e.g., which Ni transmitters of N total transmitters are simultaneously active, which Ai antennas of A total antennas are active, which Mi bands of M total bands are being transmitted, which Ti technologies of T total technologies are utilized, which Ci channels of C total channels are selected, etc. Note per the description hereinabove that Ni≤N, Ai≤A, Mi≤M, Ti≤T, and Ci≤C. Further note that, e.g., there may be multiple possible combinations of Ni transmitters for a device accommodating N total transmitters, i.e., there is generally a plurality $$\binom{N}{Ni}$$

or "N choose Ni" possible ways to choose Ni transmitters out of N total transmitters. As a plurality Ni of transmitters are simultaneously active according to the selection at block 1050, the other parameters shown may also (but need not) be larger than 1. For example, if Ni=2, i.e., two transmitters out of N are simultaneously active, then each transmitter may transmit on a different band (i.e., Mi=2); alternatively, both transmitters may transmit on a single band (i.e., Mi=1). The same applies to the other parameters shown in block 1050, e.g., technologies, channels, etc.

As a specific example, consider the case wherein N=4, M=4, T=4, and C=12. For this illustrative implementation, setting the specific combination of parameters at block 1050 may include setting Ni=2, Mi=2, Ti=2, Ci=2. As an exemplary instance of these settings, transmitter #1 (of 4 total transmitters) may be active, with transmitter #1 transmitting at a first channel (of 12 channels) of a first band (of 4 total bands) using LTE technology. Furthermore, transmitter #2 may be active, with transmitter #2 transmitting at a second channel of a second band using W-CDMA technology. It will be appreciated that the preceding combination is provided for illustrative purposes only, and is not meant to limit the scope of the present disclosure. In general, note that any transmitter may transmit using a parameter, e.g., technology, independently of the corresponding parameter used by any other transmitter, depending on the operating technology combinations supported by the wireless device.

At block 1055, for the combination selected at block 1050, a specific position (e.g., right vs. left, cheek vs. tilt, head vs. body) is further selected from a total number P of possible device positions relative to a human body.

Note for the specific combination of input parameters as selected at blocks 1050 and 1055, the power levels of the active transmitters are set to their maximum levels, so that the maximum exposure caused by the device according to such combination of parameters may be determined according to the subsequent measurement blocks.

At block 1060, it is checked whether the specific combination of transmitter(s)-band(s)-technologies-channel(s)-position meets FCC exclusion criteria. In particular, such criteria specify certain combinations for which compliance determination is not necessary. For example, the FCC exclusion criteria for the 1 g-SAR metric for a two-active-transmitter combination is that a predetermined factor (e.g., as determined by the sum of the stand-alone 1 g-SAR for each pair of antenna/distance in centimeters between peak SAR locations of two transmitters) is less than 0.3. Additionally, for combinations with 2 or more active transmitters, if the summation of peak SAR's determined for individual transmitters in block 1035 is less than 1.6, the FCC exclusion criteria stipulates that such combinations can also be excluded from further investigation. If the given combination meets the FCC exclusion criteria, then the specific combination need not be investigated, per block 1065. If the given combination does not meet the FCC exclusion criteria, then the method proceeds to block 1070.

At block 1070, oversize volume SAR scans are performed. An "oversize" volume scan may refer to a scan performed over a volume that is sufficiently large so as to cover all regions that may correspond to high SAR (also denoted herein as "hotspots") in the vicinity of the wireless device. For example, for a device with multiple antennas, there may be multiple such hotspots, and thus the oversize volume will need to be sufficiently large so as to enclose all such hotspots. In a typical implementation, the oversize volume SAR scan may be performed by turning on each transmitter selected in block 1050 one transmitter at a time. However, an exception may be made for those instances wherein two or more active transmitters are operating at the same frequency. In these cases, the oversize volume SAR scan may be performed by simultaneously turning on such two or more transmitters, as the field generated by such transmitters simultaneously active on the same frequency should be added coherently.

At block 1075, spatial summation over all oversize volume scans for all active transmitters is performed to determine the aggregate volume SAR data.

At block 1080, based on aggregate volume scan data derived at block 1075, aggregate SAR over a mass, e.g., 1 g or 10 g, is calculated, corresponding to the aggregate SAR for the specific parameter combination selected at blocks 1050 and 1055. Furthermore, at block 1080, it is checked whether the calculated aggregate SAR exceeds the prescribed limits, e.g., as defined according to the applicable standards or regulations. If the limits are exceeded, then the method 1000 proceeds to block 1081. If the limits are not exceeded at block 1080, then the method 1000 proceeds to block 1085.

At block 1081, the power level(s) of the transmitters may be reduced and recorded, and the method 1000 may return to block 1070 to perform the SAR determination at the reduced power level.

At block 1085, the parameter combination is deemed compliant, and the method 1000 proceeds to investigate further combinations, e.g., by iterating through the remaining positions and combinations of interest. Tx power levels may be recorded at block 1085.

After iterating through all remaining combinations, the method 1000 proceeds to block 1090. At block 1090, a look-up table may be established using the recorded (possibly reduced) power levels that were found to cause the wireless device to be compliant over the different operating scenarios. In an implementation, the look-up table may be loaded into a memory of the wireless device, and the look-up table may be relied upon to determine the allowable in-field transmit power levels for the wireless device to ensure SAR compliance. In certain implementations, the measurements indicated in FIGS. 10 and 10A may be performed on a prototype device, while the look-up table obtained therefrom may be loaded into the memory of devices that are subsequently mass-produced.

At block 1095, the compliant device may be shipped to market, where it may be used by an operator of the device, e.g., in "real time."

From the description hereinabove, it will be appreciated that the total number of measurements (e.g., volume scans performed at block 1070) required during certification may be exceedingly large, given the multiple possible band/transmitter combinations to be iterated through. For example, assuming M bands and N transmitters, the total number of possible combinations of bands and transmitter(s) may be computed as (Equation 1):

$$\text{Number of combinations of bands and transmitters} = \sum_{k=1}^{N} \binom{N}{k} M^k;$$

wherein $$\binom{N}{k}$$

or "N chose k" expresses the number of different subsets of size k that may be chosen from a set of N elements. For example, for a 10-band, 4-transmitter device (i.e., M =10, N=4), the Number of combinations computed per Equation 1 is equal to 14,640. Furthermore, given 3 channels, 3 technologies, and 5 positions (i.e., C=3, T=3, P=5), the total number of SAR assessments (i.e., surface scan followed by volume scan, with each such scan also including a plurality of point measurements) would be 658,800. From these estimates, it will be appreciated that the prior art testing method 1000 may require an excessive amount of time to test a wireless device having the typical parameters described.

Techniques of the present disclosure advantageously decrease the number of required SAR measurements required in the certification process, while nevertheless allowing reliable determination of whether the wireless device complies with RF exposure standards. According to the present disclosure, rather than performing surface then volume scans across all possible combinations of bands and transmitters, scans need only be performed across a subset of all possible parameter combinations. In particular, a surface scan is performed for each band, but with only one transmitter and one antenna activated at a time. Following the surface scan(s), no volume scan is performed. For example, in an exemplary embodiment, for the 10-band, 4-transmitter device earlier described hereinabove, only 10 surface scans (i.e., for each band) need be performed for each of the four transmitters, resulting in 40 total surface scans.

The results of the surface scans may subsequently be stored in a memory of the wireless device. During real-time operation of the wireless device, an algorithm implemented by a processor of the wireless device uses the stored surface scans, along with knowledge of the real-time exposure or operating scenario (e.g., knowledge of the real-time active transmitter(s), antenna(s), band, technology, position, etc.), to determine the appropriate power levels for individual transmitters to meet regulatory requirements, e.g., for aggregate SAR over a 1 g/10 g mass. Further details of exemplary embodiments according to the present disclosure are described hereinbelow.

Figure 11:
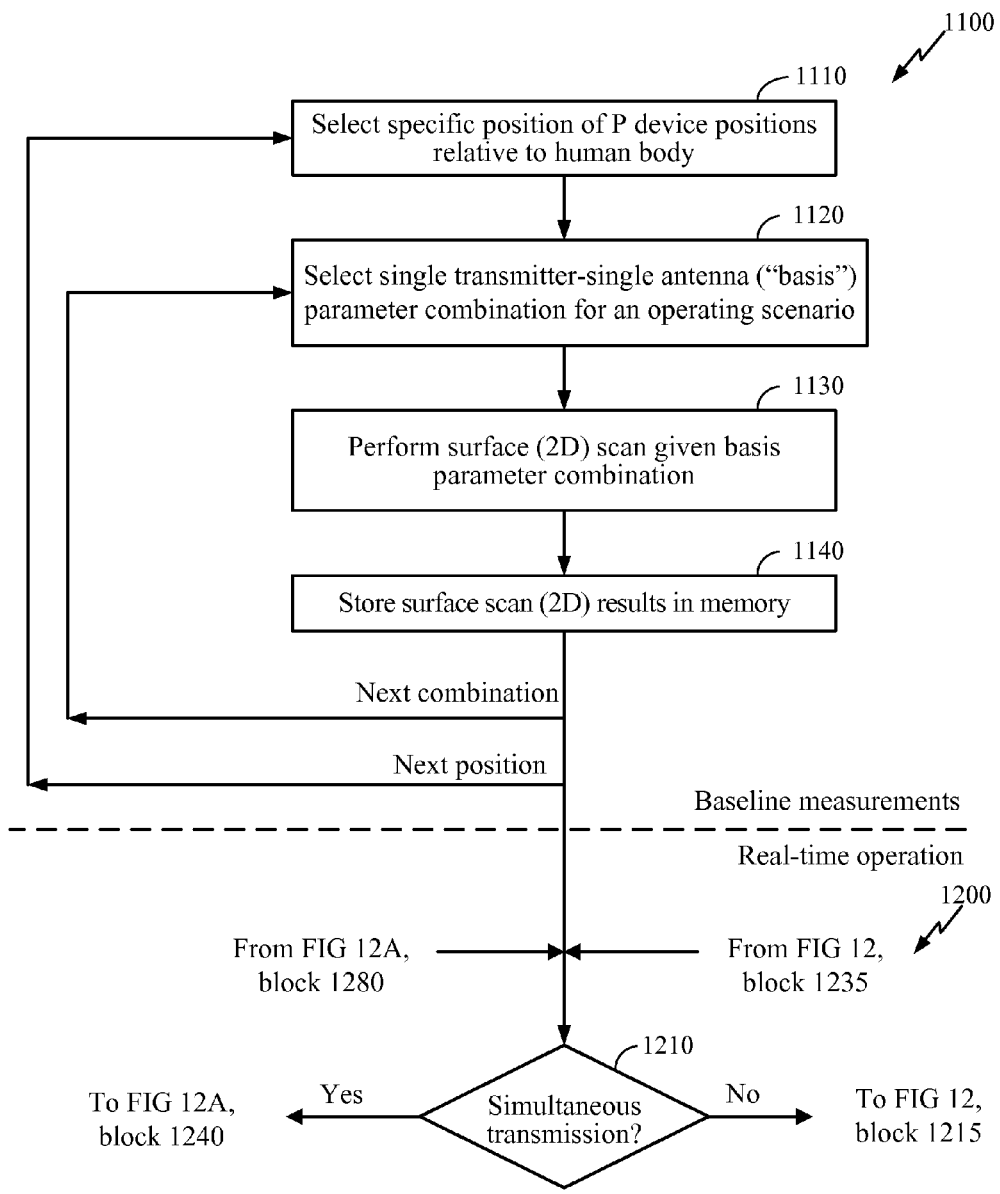
FIG. 11 illustrates an exemplary embodiment of a method according to the present disclosure.

FIG. 11 illustrates an exemplary embodiment 1100 of a method according to the present disclosure. Note the method 1100 is shown for illustrative purposes only, and is not meant to limit the scope of the present disclosure. It will further be appreciated that, unless otherwise explicitly noted, alternative exemplary embodiments of the present disclosure need not follow the exact sequence of iterations shown in FIG. 11, e.g., block 1120 may precede block 1110, etc. Such alternative exemplary embodiments are contemplated to be within the scope of the present disclosure.

In FIG. 11, at block 1110, a specific position (e.g., right vs. left, cheek vs. tilt, head vs. body) is selected from a total number P of possible device positions relative to a human body.

At block 1120, a single transmitter-single antenna parameter combination for a specific operating scenario is selected and enabled for the wireless device. A parameter combination specifying only one active transmitter and one active antenna is also denoted herein as a "basis parameter combination." In particular, a basis parameter combination may specify a single active transmitter (out of N possible transmitters) and a single active antenna (out of A possible antennas), along with other parameters defining the combination, e.g., a specific band (out of M supported bands), a specific technology (e.g., WCDMA, LTE, etc.) selected from a total number T of technologies, etc. The basis parameter combination may also specify a specific channel, e.g., frequency channel within a band, selected from a total number C of channels in each band. Note the basis parameter combination may also specify the position to be tested as a parameter.

At block 1130, a surface (e.g., two-dimensional or "2D") scan is performed, given the basis parameter combination selected at block 1120. In an exemplary embodiment, either an SAR scan or an E-field scan (or "E-scan") may be performed at block 1130. In an exemplary embodiment, field probes 140 that can measure both magnitude and phase of electric field are provided to obtain magnitude and phase information of the three orthogonal components (e.g., x-, y-, and z-components) of the E-field.

Note if multiple simultaneously active transmitters operating at the same frequency are supported by the wireless device, then an E-scan may be performed for each single transmitter-single antenna combination that is involved in the simultaneous transmission so that the effects of coherent summation of the E-fields generated by the multiple transmitters during real-time operation can be captured. Otherwise, if the multiple simultaneously active transmitters operate at different frequencies, then either an E-scan or an SAR scan may be performed at block 1130.

The surface scan obtained at block 1130 is also denoted herein as a "basis surface scan," in view of the fact that only one transmitter and one antenna are activated. As further described hereinbelow, the basis surface scans may subsequently be extrapolated to 3D, and the results may be aggregated to determine composite SAR's for multiple simultaneously active transmitters and/or antennas, e.g., during real-time operation of the device using a predetermined algorithm.

In an exemplary embodiment, the surface scan may encompass a surface that encloses regions of high SAR corresponding to all active antennas. In an exemplary embodiment, all the basis surface scans performed at block 1130 are intended to cover a region that may be coextensive with the physical footprint of the entire wireless device 120 and its antennas 121, so that the SAR or E peaks from all basis parameter combinations are captured. Furthermore, the spatial resolution of the surface scan may be adjusted based on the transmitting frequency. In particular, the resolution of the basis surface scans may be varied depending on the operating frequency of the basis parameter combination, with increased resolution generally desirable for higher frequencies.

At block 1140, the basis surface scan results are stored in a memory. In an exemplary embodiment, the memory may be provided on the wireless device being tested. The surface scan results measured using probe 140 can be stored in the memory in terms of either electric field or point SAR.

Following block 1140, the method 1100 iterates through the remaining combinations not tested, e.g., proceeding through different combinations of technology, channel, band, transmitter, antenna, position, etc.

It will be appreciated that blocks 1110, 1120, 1130, 1140 may correspond to operations performed prior to real-time operation of the device, e.g., during a laboratory measurement phase. Blocks 1110-1140 are also denoted herein as corresponding to "baseline measurements," as indicated in FIG. 11.

As further described hereinbelow with reference to the method 1200, including blocks 1210-1280, the basis surface scan results stored in memory may subsequently be used by a processor to compute expected SAR values in real time. In particular, the computations may be performed for real-time operating scenarios wherein a single transmitter is active, as well as for scenarios wherein possibly multiple transmitters and/or antennas are simultaneously active. For multiple simultaneously active transmitters and/or antennas, the processor may perform computations using a pre-determined algorithm such as described with reference to blocks 1255-1260 hereinbelow for appropriately extrapolating and aggregating the basis surface scan results to compute mass-averaged SAR in real time.

In particular, following the baseline measurements indicated in FIG. 11, the method 1100 may proceed to real-time operation of the wireless device. In general, during real-time operation, an algorithm embedded in a processor of the wireless device may calculate the real-time aggregate peak spatial-average SAR based on the stored basis surface scans in the memory of the device. The embedded algorithm takes into account the specific real-time operating scenario parameter combination, e.g., the band, transmitter, antenna, channel, technology, position, etc., corresponding to the real-time operating scenario.

In an exemplary embodiment, the embedded algorithm may load the basis surface scans from memory for currently active transmitters and antennas according to the real-time parameter combination. In particular, it will be appreciated that an arbitrary real-time parameter combination may generally be decomposed into a collection of one or more basis parameter combinations. For example, a real-time parameter combination specifying an active transmitter #1, whose output signal is coupled to active antenna #1, and an active transmitter #2, whose output signal is coupled to active antenna #2, may be decomposed into two basis parameter combinations, i.e., a first basis parameter combination corresponding to active transmitter #1 and active antenna #1, and a second basis parameter combination corresponding to active transmitter #2 and active antenna #2. Alternatively, a real-time parameter combination specifying an active transmitter #1, whose output signal is coupled to both active antenna #1 and active antenna #2, may also be decomposed into two basis parameter combinations, i.e., a first basis parameter combination corresponding to active transmitter #1 and active antenna #1, and a second basis parameter combination corresponding to active transmitter #1 and active antenna #2. It will be appreciated that one of ordinary skill in the art may readily derive the basis parameter decomposition for an arbitrary real-time parameter combination in view of the description hereinabove.

Upon retrieving the basis surface scan(s) stored in memory corresponding to the basis parameter combination(s) so determined, the embedded algorithm may extrapolate the 2D point SAR (or E-field) of each basis surface scan over a 3D volume, to estimate the mass-averaged SAR (e.g., 1 g or 10 g mass) distribution in the volume projected by each basis (or "sub-group" as further described hereinbelow) surface scan into the body phantom 150. The operations of 2D-to-3D extrapolation and estimating the mass-averaged SAR may be performed according to techniques known in the art, e.g., as disclosed in Kanda et al., "Faster determination of mass-averaged SAR from 2-D area scans," IEEE Trans. Microwave Theory Techniques, 52(8):2013-2020, 2004. For example, as per Kanda, the single-transmitter-single-antenna mass-averaged SAR (e.g., 1 g or 10 g mass) may be estimated from a basis surface scan using knowledge of the transmit frequency of the basis parameter combination.

In an exemplary embodiment, if two or more basis parameter combinations specify transmission at the same frequency, then such basis parameter combinations may be initially grouped into a "sub-group." Vector and spatial summation may be performed on the magnitude and phase information of electric fields stored in the basis surface scans of the same sub-group, to account for the coherent addition of electric field from transmitters at the same frequency. Point SAR determined from such coherently summed electric fields for basis surface scans specifying the same transmit frequency may subsequently be referred to as a representative "sub-group surface scan."

Following determination of the extrapolated basis or sub-group mass-averaged SAR distribution in the volume projected by the corresponding surface scan into the body phantom 150, the mass-averaged volume SAR data may be spatially summed across all 3D-extrapolated basis and/or all 3-D extrapolated sub-group SAR to determine aggregate mass-averaged SAR, accounting for the total contributions to SAR from all basis parameter combinations corresponding to the real-time parameter combination. The peak mass-averaged SAR is then determined from the aggregate mass-averaged volume SAR.

In an exemplary embodiment, the real-time determination of aggregate SAR (e.g., peak mass-averaged SAR) may be utilized by a user of the wireless device to track the current SAR in real-time. The wireless device may further utilize the determination of aggregate SAR's to ensure that the prescribed SAR limits are not exceeded by adjusting the average transmitter power levels of the wireless device over any specified time window for the current exposure scenario. For example, if the aggregate SAR is higher than allowed by the applicable standards or regulations, then the power levels from the active transmitters may be decreased. Conversely, if the aggregate SAR is lower than allowed, then the power levels from the active transmitters may be increased as needed.

Figure 12:
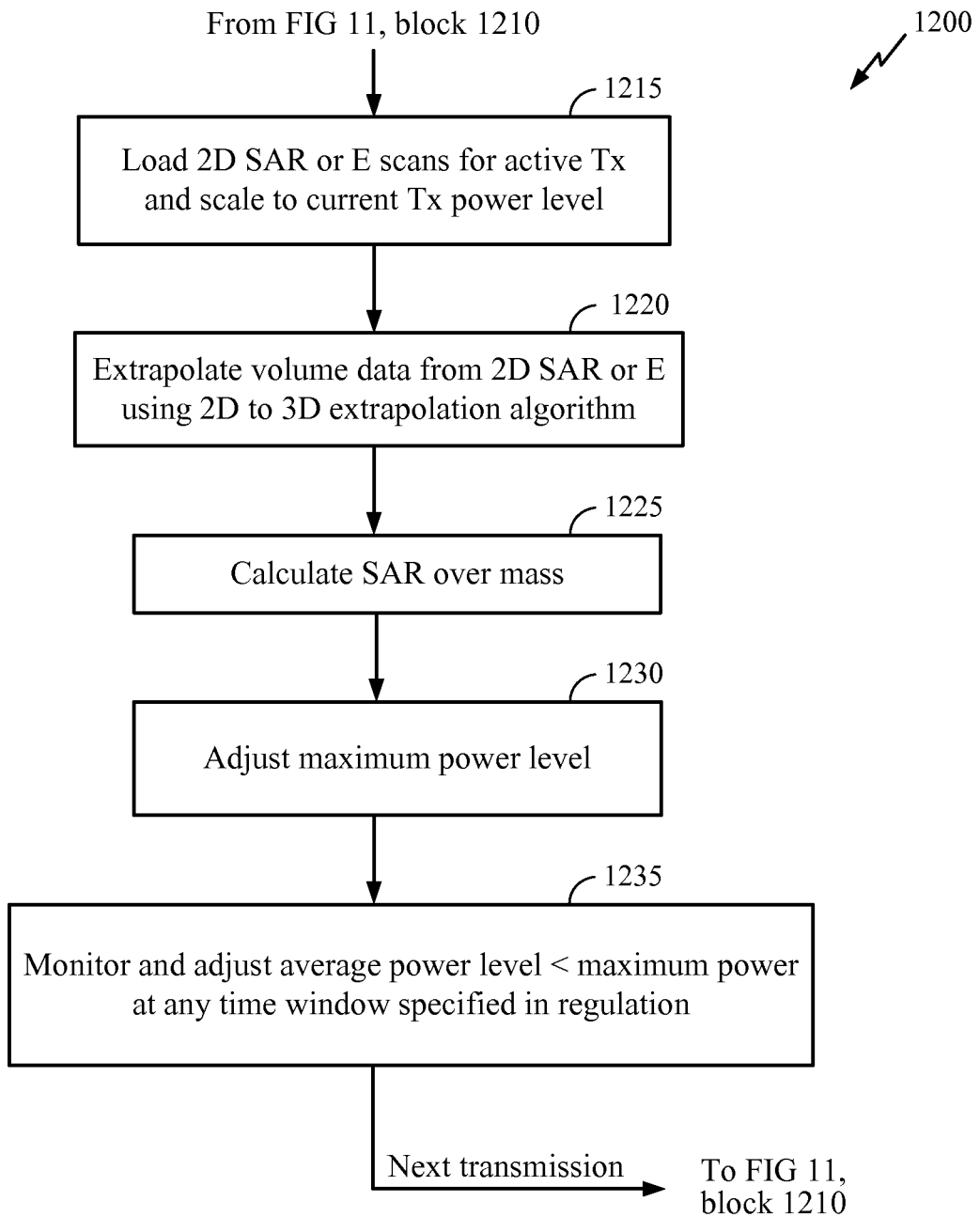
FIG. 12 illustrates real-time operations performed when it is determined that multiple transmitters are not simultaneously active, e.g., only one transmitter or antenna is active.
Figure 12A:
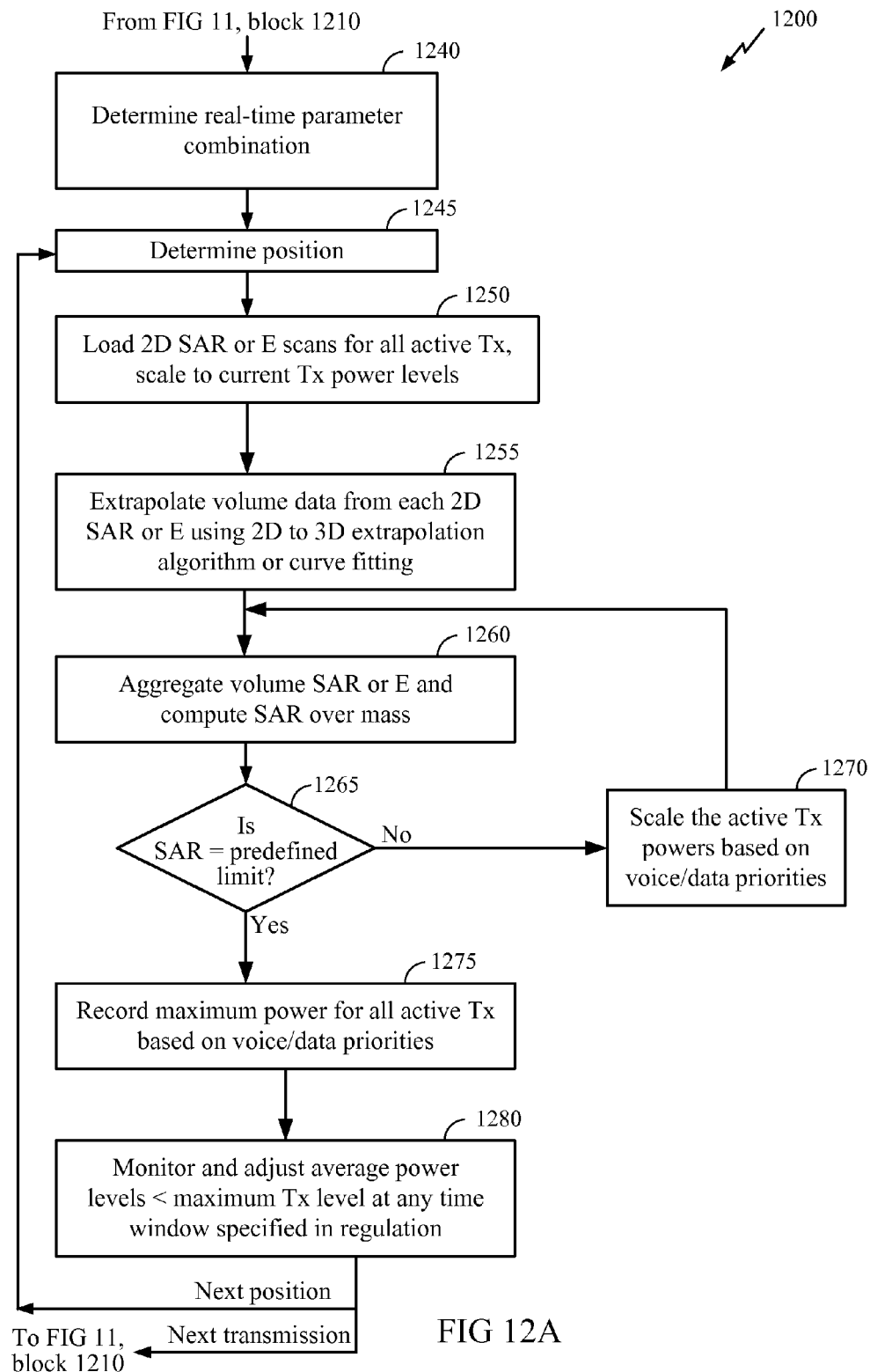
FIG. 12A illustrates real-time operations performed when it is determined that multiple transmitters are simultaneously active.

Method 1200, further illustrated in block 1210 of FIG. 4 and FIGS. 12, 12A, further describes in detail an exemplary embodiment of operations performed during real-time operation of the wireless device according to the present disclosure. It will be appreciated that the real-time operations described with reference to method 1200 are given for illustrative purposes only, and are not meant to limit the scope of the present disclosure to any particular operation or sequence of operations to be performed in real-time by a wireless device. In alternative exemplary embodiments, one of ordinary skill in the art may omit certain operations from those shown, or add certain auxiliary operations not explicitly described, without departing from the scope of the present disclosure. Such alternative exemplary embodiments are contemplated to be within the scope of the present disclosure.

In alternative exemplary embodiments, it will be appreciated that the method 1200, including blocks 1210-1280, may be practiced independently of the method 1100, including blocks 1110-1140 in FIG. 11. For example, in an alternative exemplary embodiment (not shown), the SAR or E-field data corresponding to the basis surface scans may alternatively be derived from computer electromagnetic simulation or a mixture of simulation and measurement, rather than exclusively from measurement using a test set-up 100 such as described with reference to method 1100 of FIG. 11. Such alternative exemplary embodiments are contemplated to be within the scope of the present disclosure.

At block 1210, during real-time operation of the wireless device, it is determined whether the wireless device is currently (i.e., in real-time) transmitting simultaneously using multiple transmitters or antennas. If no (e.g., only one transmitter or antenna is active), the method proceeds to block 1215 of FIG. 12. If yes (e.g., multiple transmitters or antennas are simultaneously active), the method proceeds to block 1240 of FIG. 12A.

FIG. 12 illustrates real-time operations performed by the method 1200 when it is determined that multiple transmitters or antennas are not simultaneously active, e.g., only one transmitter and one antenna are active.

In particular, at block 1215, if there is no simultaneous transmission during real-time operation, the wireless device will determine the parameter combination for the current active transmitter, as well as the current active transmitter's power level. It will be appreciated that the wireless device will generally have access to real-time information about, e.g., the specific band(s), transmitter(s), channel, antenna(s) and technology, as such information may be available from one or more components of the device, e.g., the transmitter modem and/or embedded co-existence manager of the device. The stored basis surface scan (electric fields or point SAR data) corresponding to this parameter combination is retrieved from memory. At block 1220, 2D-to-3D extrapolation is performed, to determine the mass-averaged SAR (e.g., over a mass of 1 g or 10 g) distribution in the volume projected by the surface scan into the body phantom 150.

At block 1225, the peak mass-averaged SAR (e.g., 1 g or 10 g) is calculated from the extrapolated 3D volume mass-averaged SAR determined in block 1220.

At block 1230, the current transmitter power level is adjusted to determine the maximum transmitter power level so that the peak mass-averaged SAR value determined in block 1225 meets the SAR limits. It will be appreciated that such adjustment may include either decreasing or increasing the TX power level.

At block 1235, the average transmitting power level of the active transmitter is continuously monitored. In an exemplary embodiment, this transmitter power level may be increased or decreased such that the average power level meets the mass-averaged SAR limits over any time window specified in the regulation.

FIG. 12A illustrates real-time operations performed by the method 1200 when it is determined at block 1210 that multiple transmitters are simultaneously active.

In FIG. 12A, at block 1240, the parameter combination for the real-time operating scenario, i.e., the real-time parameter combination, is determined. For example, the real-time parameter combination specifies the real-time band(s), channel(s), transmitter(s), antenna(s), technology, etc., as well as the per-transmitter power levels, and may be input to a processor of the wireless device implementing the algorithm described herein. In an exemplary embodiment, the real-time transmit power levels of the device may be directed by a network, e.g., according to a power control scheme defined in industry standards, etc. It will be appreciated that the wireless device will generally have access to real-time information about the real-time operating parameters, as such information may be available from, e.g., the transmitter modem and/or embedded co-existence manager of the device.

At block 1245, the wireless device position relative to the body is determined. For example, such information may be obtained from one or more body position sensors of the wireless device.

At block 1250, the stored basis surface scans (e.g., SAR or E-field data) corresponding to the real-time parameter combination are retrieved from memory, and scaled according to their Tx power levels. In particular, as earlier described hereinabove, an arbitrary real-time parameter combination may generally be decomposed into a collection of one or more basis parameter combinations.

Once the one or more basis parameter combinations for the real-time parameter combination are determined, the components of the corresponding one or more basis surface scans are retrieved from memory. In particular, such components may include, e.g., magnitude and phase components of the E-field, or point SAR. Further at block 1250, the components of each loaded basis surface scan are scaled according to the real-time transmitter power level corresponding to that basis parameter combination. For example, assume that transmitters #1 and #2 of a five-transmitter system are enabled for the given combination, with transmitter #1 transmitting at power level P1 and transmitter #2 transmitting at power level P2. Then, at block 1250, the basis surface scans for transmitters #1 and #2 are loaded for further processing. Furthermore, the basis surface scan for transmitter #1 is scaled by P1, while the basis surface scan for transmitter #2 may be scaled by P2.

Note in the preceding example, each transmitter is assumed to be directly coupled to a single antenna, and the antenna corresponding to each transmitter is therefore not additionally specified in this example, purely for ease of discussion. However, one of ordinary skill in the art will appreciate that the scope of the present disclosure covers real-time parameter combinations in which transmitter(s) are arbitrarily coupled to antenna(s), and therefore different transmitter-antenna couplings will generally necessitate the loading and scaling of different basis surface scans.

At block 1255, volume data (also denoted herein as "volume SAR") is extrapolated from each loaded basis surface scan. In particular, as earlier described hereinabove, each basis or sub-group surface scan forms the basis of a 2D-to-3D extrapolation of 2D SAR data to a 3D volume projected by the 2D surface scan area into the body phantom 150. In an exemplary embodiment, the size of the volume may be large enough to encapsulate the peak SAR locations from all active transmitters/antennas in the wireless device 140. The extrapolation may be performed using 2D-to-3D extrapolation algorithms, e.g., such as disclosed in Kanda et al., earlier referenced hereinabove. Other curve-fitting techniques known in the art may also be applied, and such alternative exemplary embodiments are contemplated to be within the scope of the present disclosure.

At block 1260, the basis or (sub-group) volume SAR's as determined at block 1255 are aggregated, e.g., summed, over the entire volume projected by the surface scan into the body phantom. Further at block 1260, the peak mass-averaged (e.g., 1 g or 10 g) SAR is computed from the aggregated volume SAR's.

At block 1265, it is checked whether the SAR determined at block 1260 is equal to a predefined limit. For example, in the case of 1 g SAR, the regulatory limit corresponds to 1.6 W/kg, and in the case of 10 g SAR, 2.0 W/kg. In an exemplary embodiment, the SAR used for this comparison may correspond to the peak (spatial) mass-averaged SAR, as averaged in time over a specific time window. If the peak mass-averaged SAR is not equal to the predetermined level, then the method proceeds to block 1270, wherein the TX power levels for each active transmitter can be iteratively adjusted via blocks 1260, 1265, 1270, e.g., based on voice and/or data priorities.

For example, if three transmitters, e.g., TX #1, TX #2 and TX #3, are active in the current operating scenario, priority levels may assigned to each of these transmitters by the wireless device based on whether the transmitter is currently supporting voice or data transmission, e.g., as defined in the product specification. If the predefined limit for the aggregate mass-averaged SAR is not exceeded at the current power levels, then the power of the transmitter with the highest priority may be increased as needed until the SAR reaches its maximum allowed level. Subsequently, the power of the transmitter with the next highest priority may be increased, etc., until the condition at block 1265 is satisfied. Similarly, the TX power levels may be decreased according to priority levels if the SAR exceeds the limit. In an exemplary embodiment, each parameter combination may have a distinct assignment of voice and data to transmitters.

Note the iterative process described with reference to blocks 1260-1270 is provided for illustrative purposes only, and is not meant to limit the scope of the present disclosure. One of ordinary skill in the art may readily derive alternative exemplary embodiments for adjusting the per-transmitter power levels to comply with the SAR requirements. Note once the condition at block 1265 is satisfied, then the method proceeds to block 1275.

At block 1275, the maximum allowable power is recorded for all active transmitters based on voice/data priorities for the current operating scenario.

At block 1280, average transmitting power levels of all the active transmitters are continuously monitored to ensure that they are less than the maximum allowable power levels determined and recorded at block 1275. In an exemplary embodiment, once the maximum power levels are determined at block 1275, then for the current operating scenario they need not be continuously computed during real-time operation of the device. Note however that the real-time power levels may be continuously monitored to ensure the average power over any specified time window remains less than the maximum power levels.

In particular, note that some regulatory bodies provide a time-averaged window, e.g., 6 minutes, for SAR, effectively mandating that the SAR of a device when averaged over any 6-minute time window should be less than the prescribed limit. In general, the SAR can exceed the time-averaged limits for brief periods of time, as long as the time-averaged SAR is less than the limit. Note that the 6-minute time window is mentioned herein for illustrative purposes only, and is not meant to limit the scope of the present disclosure.

In an exemplary embodiment, the per-transmitter power levels may be adjusted to be less than the maximum per-transmitter power limit over any time window specified in the regulations for peak mass-averaged SAR. Note if there is only a change in position of the wireless device relative to the body, then the real-time method may be repeated from block 1245. On the other hand, if there is a change in the operating condition (e.g., transmitter(s)/antenna or band(s) or technology of channel(s)), then the method may be repeated from block 1210.

By providing real-time construction or estimation of SAR from the stored basis surface scan and real-time parameter combination, it will be appreciated that the number of SAR measurements that need to be performed on a device 120 according to method 1100 will be significantly reduced as compared to method 1000. For example, for a 10-band, 4-transmitter device (i.e., M=10, N=4) accommodating 3 channels, 3 technologies, and 5 positions earlier described hereinabove, the total number of SAR surface scan measurements would be 10×4×3×3×5=1800, corresponding to a 366× factor reduction in the number of measurements required (assuming for ease of illustration that all combinations of M, N, T, C, and P are supported by the wireless device). Furthermore, the cost savings would also include the time reduction afforded by performing only surface scans, as opposed to surface scan plus volume scan for each parameter combination.

While exemplary embodiments have been described herein with reference to techniques for ensuring compliance with RF exposure regulations, one of ordinary skill in the art will appreciate that the present techniques may also be utilized in applications for ensuring compliance with, e.g., hearing aid compatibility (HAC) exposure regulations. Such alternative exemplary embodiments are contemplated to be within the scope of the present disclosure.

Figure 13:
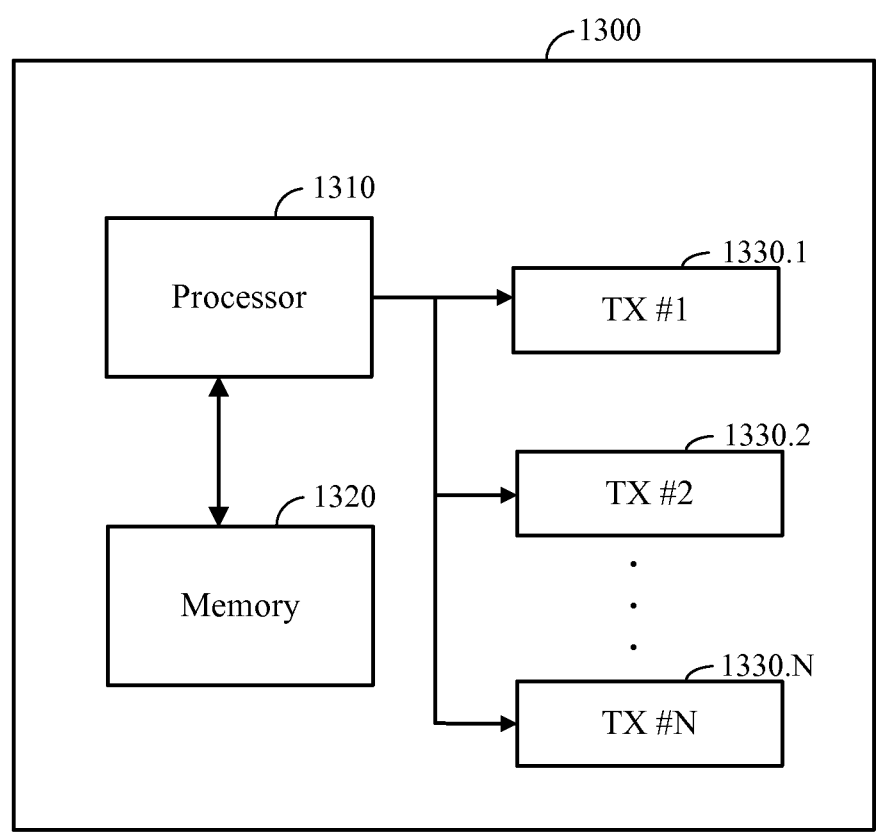
FIG. 13 illustrates an exemplary embodiment of a wireless device for implementing the techniques of the present disclosure.

FIG. 13 illustrates an exemplary embodiment of a device for implementing the techniques of the present disclosure. Note FIG. 13 is shown for illustrative purposes only, and is not meant to limit the scope of the present disclosure.

In FIG. 13, a device 1300 includes a processor 1310, a memory 1320, and transmitters 1330.1 through 1330.N. The memory 1320 may store basis surface scans as determined, e.g., according to the baseline measurement blocks 1110-1140 described with reference to FIG. 11. Alternatively, the basis surface scans stored in memory 1320 may be derived from electromagnetic simulations, or a combination of simulation and measurement.

During real-time operation, the processor 1310 may load the basis surface scan or scans corresponding to the real-time parameter combination from the memory 1320. The processor 1310 may estimate the SAR based on knowledge of the position and real-time parameter combination, e.g., as described with reference to FIGS. 12 and 12A. Based on the estimated SAR, the processor 1310 may further adjust the power levels of the transmitters 1330.1 through 1330.N to ensure RF exposure compliance of the device 1300, according to the principles of the present disclosure.

In light of the present disclosure, it will be appreciated that an algorithm implementing the methods described may be embedded into the processor 1310 to assess and ensure compliance of a wireless device with RF exposure requirements in real time. In particular, compliance of a wireless device with regulatory requirements is advantageously evaluated and ensured in real-time, in contrast with prior art approaches which require demonstrating compliance using prior testing of the wireless device across a large number of possible operating parameter combinations, e.g., combinations specifying active transmitter(s)/antenna(s), frequency band(s), channel(s), technologies, and position(s) relative to a body.

In an exemplary embodiment, the device 1300 may be a wireless device, and the processor 1310 and memory 1320 storing instructions for causing the processor to execute the algorithm described herein may be integrated in, e.g., a baseband modem integrated circuit (IC) of the wireless device, while the transmitters may be separately provided on a radio-frequency (RF) IC. In an alternative exemplary embodiment, the device 1300 may be provided separately from the wireless device whose exposure compliance is to be determined, e.g., the processor 1310 and memory 1320 may be provided in a computer configured to determine exposure compliance of one or more wireless devices of interest. Such alternative exemplary embodiments are contemplated to be within the scope of the present disclosure.

Further aspects of the present disclosure provide for exporting SAR or E-field data from electromagnetic simulations using the NFES representation on a two-dimensional surface of SAM/body phantom, for various positions relative to the NFES representation of wireless device. These data (corresponding to simulated SAR or E-field scans) may be stored in a memory during a certification phase. In an exemplary embodiment, each surface scan may correspond to a basis surface scan wherein the NFES was determined when only one of a plurality of transmitters and antennas of the wireless device is active.

Figure 14:
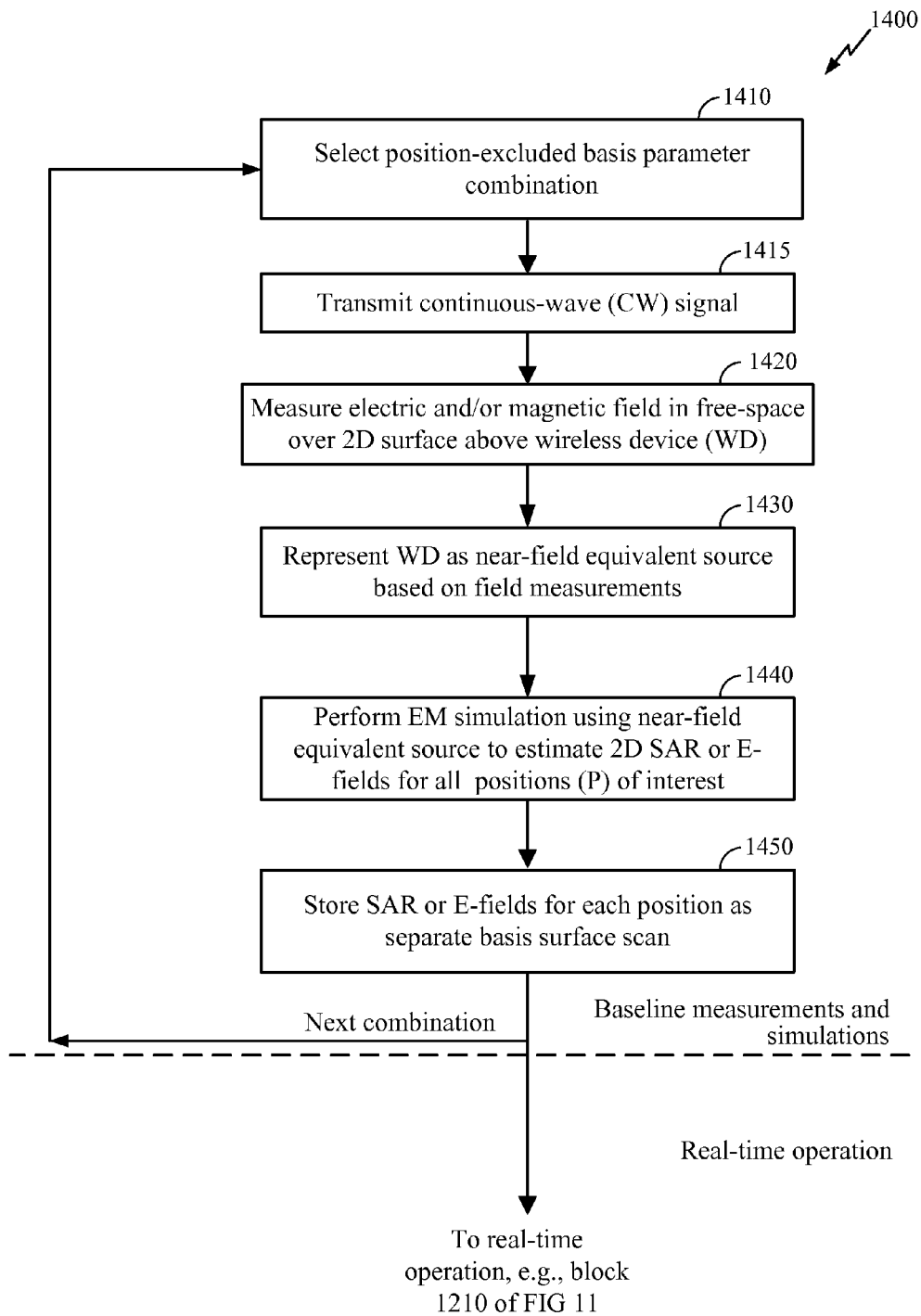
FIG. 14 illustrates an exemplary embodiment of a method according to the present disclosure, wherein near-field equivalent source representation techniques are combined with techniques for deriving baseline data for real-time SAR computation according to the present disclosure.

FIG. 14 illustrates an exemplary embodiment of a method 1400 according to the present disclosure, wherein near-field equivalent source representation techniques are combined with techniques for deriving baseline data for real-time SAR computation according to the present disclosure. Note FIG. 14 is shown for illustrative purposes only, and is not meant to limit the scope of the present disclosure to any particular method described. In particular, it will be appreciated that the techniques for deriving a near-field equivalent source representation described with reference to FIGS. 1-8 generally need not be combined with the techniques for real-time SAR computation described with reference to FIGS. 9-14, and the techniques may generally be practiced independently of each other. Such exemplary embodiments are contemplated to be within the scope of the present disclosure.

In FIG. 14, at block 1410, a position-excluded basis parameter combination is selected. As earlier described hereinabove, a basis parameter combination specifies a parameter combination wherein only one transmitter and only one antenna of the wireless device are active. Furthermore, a "position-excluded" basis parameter combination does not specify the position of the WD relative to the human body. The position-excluded basis parameter combination may also specify other parameters of the operating scenario, including, e.g., band, channel, etc.

At block 1415, a continuous-wave (CW) signal is transmitted according to the parameter combination selected at block 1410.

At block 1420, electric and/or magnetic fields are measured in free space over a 2D surface above the wireless device.

At block 1430, based on the fields measured at block 1420, the WD is represented as a near-field equivalent source (NFES). In an exemplary embodiment, as earlier described hereinabove, the NFES may be based on a dipole array representation derived from the field measurements.

At block 1440, the NFES derived at block 1430 is input to an electromagnetic simulator to estimate SAR or E-fields over a 2D surface. In an exemplary embodiment, the 2D surface may correspond to and be chosen similarly to a 2D surface that would otherwise be used to perform the 2D surface scan using a test set-up 100, e.g., as specified at block 1130 in the method 1100 of FIG. 11. However, it will be appreciated that, in contrast to the method 1100 of FIG. 11, the method 1400 of FIG. 14 advantageously does not require performing 2D surface scan measurements separately for each position of the WD relative to the human body. Rather, the method 1400 derives the SAR or E-field data for each position from, e.g., computer electromagnetic simulations using the NFES representation obtained at block 1430. In this way, by performing electromagnetic simulations using the NFES representation, the actual measurement time required to derive all position-dependent basis surface scans for a WD may be reduced by a significant factor.

At block 1450, the SAR or E-fields determined for each position from NFES simulation at block 1440 are stored as a separate basis surface scan. In an exemplary embodiment, such scan data may be stored in a memory of the wireless device, and subsequently retrieved from memory during real-time operation of the wireless device to facilitate real-time SAR assessment, as previously described hereinabove with reference to FIGS. 12 and 12A.

Following block 1450, the method 1400 iterates through the remaining position-excluded basis parameter combinations. Following iterations, baseline measurements and simulations are complete, and the method 1400 may proceed to real-time operation, e.g., starting with block 1210 of FIG. 11. As previously described hereinabove with reference to FIGS. 9-13, during real-time operation, the basis surface scan or scans corresponding to the real-time parameter combination of the wireless device are retrieved. The retrieved scans are processed according to the parameters of the real-time operating scenario to determine an estimated RF exposure metric, e.g., a peak specific absorption rate (SAR). The transmit power levels of the device may be adjusted in real time to ensure compliance of the estimated RF exposure metric with applicable standards and regulations.

By using the NFES to derive position-dependent basis surface scans via simulation, it will be appreciated that the number of SAR measurements that need to be performed on a device 120 according to method 1400 may further be reduced as compared to method 1100. For example, for a 10-band, 4-transmitter device (i.e., M=10, N=4) accommodating 3 channels, 3 technologies, and 5 positions earlier described hereinabove, the total number of SAR surface scan measurements (i.e., performed using an actual test set-up) would be 10×4×3×3=360, corresponding to a 5× factor reduction in the number of measurements required versus the method 1100, and accordingly, a 1830× factor reduction in the number of measurements required versus the prior method 1000.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electric- or magnetic-dipoles, electromagnetic waves, electric fields, magnetic fields or particles, specific absorption rate (SAR), optical fields or particles, or any combination thereof.

Those of skill in the art would further appreciate that the various illustrative logical blocks, modules, circuits, and algorithm steps described in connection with the exemplary aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary aspects of the invention.

The various illustrative logical blocks, modules, and circuits described in connection with the exemplary aspects disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary aspects disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media.

The previous description of the disclosed exemplary aspects is provided to enable any person skilled in the art to make or use the invention. Various modifications to these exemplary aspects will be readily apparent to those skilled in the art, and the generic principles defined herein may be applied to other exemplary aspects without departing from the spirit or scope of the invention. Thus, the present disclosure is not intended to be limited to the exemplary aspects shown herein but is to be accorded the widest scope consistent with the principles and novel features disclosed herein.

The invention claimed is:

1. A method for estimating specific absorption rate (SAR) from a wireless device (WD), the method comprising:

measuring the magnitude of at least one component of an electric or magnetic field over a two-dimensional surface in the vicinity of the wireless device; and deriving a near-field equivalent source representation of the wireless device based on the measured electric or magnetic field components, including:

producing an elementary dipole array representation of the wireless device;

validating the elementary dipole array representation with the measured electric or magnetic field components; and if the elementary dipole array representation does not correlate with the measured electric or magnetic field components as determined by an accuracy metric, then either increasing the spatial resolution of the measuring or decreasing the separation between the two-dimensional surface and the wireless device; and estimating the SAR at a location relative to the wireless device using the derived near-field equivalent source representation.

2. The method of claim 1, further comprising measuring the phase of said at least one component of the electric or magnetic field over the two-dimensional surface.

3. The method of claim 1, wherein the SAR is estimated in a standard anthropomorphic model (SAM) or body phantom.

4. The method of claim 1, the deriving the near-field equivalent source representation comprising performing an inverse transformation to produce the elementary dipole array representation of the wireless device.

5. The method of claim 4, the elementary dipole array representation comprising parameters for a plurality of electric dipoles.

6. The method of claim 4, the elementary dipole array representation comprising parameters for a plurality of magnetic dipoles.

7. The method of claim 1, the estimating the SAR comprising estimating the SAR or electric field data for a plurality of positions of the wireless device relative to a standard anthropomorphic model (SAM).

8. The method of claim 7, the estimating the SAR comprising extracting two-dimensional (2D) or three-dimensional (3D) SAR or electric field data over a tissue simulating liquid volume, the method further comprising:

storing a set of basis SAR scans in a memory of the wireless device, each basis surface scan corresponding to an SAR or electric field scan of the wireless device given a specific exposure scenario wherein only one transmitter and one antenna are enabled.

9. The method of claim 8, further comprising constructing a combined SAR based on inputs comprising the stored set of basis surface scans for all active transmitters in a given real-time exposure scenario.

10. The method of claim 1, the estimating the SAR comprising estimating the SAR for a plurality of positions of the wireless device relative to a body phantom.

11. The method of claim 1, the estimating the SAR comprising extracting two-dimensional (2D) or three-dimensional (3D) SAR or electric field data over a tissue simulating liquid volume, the method further comprising:

storing a set of basis SAR scans in a memory of the wireless device, each basis surface scan corresponding to an SAR or electric field scan of the wireless device given a specific exposure scenario wherein only one transmitter and one antenna are enabled; and constructing an aggregate SAR based on inputs comprising the stored set of basis surface scans for all active transmitters in a given real-time exposure scenario.

12. An apparatus comprising:

a memory storing the magnitudes of at least one component of an electric or magnetic field over a two-dimensional surface in the vicinity of a wireless device; and a processor configured to derive a near-field equivalent source representation of the wireless device based on the stored at least one electric or magnetic field component, including:

producing an elementary dipole array representation of the wireless device;

validating the elementary dipole array representation with the at least one electric or magnetic field component; and if the elementary dipole array representation does not correlate with the at least one electric or magnetic field component as determined by an accuracy metric, then either increasing the spatial resolution of the measuring or decreasing the separation between the two-dimensional surface and the wireless device, the processor further configured to estimate specific absorption rate (SAR) at a location relative to the wireless device using the derived near-field equivalent source (NFES) representation.

13. The apparatus of claim 12, the processor configured to derive the near-field equivalent source representation by performing an inverse transformation on measurements of the magnitude of the at least one electric or magnetic field component over the two-dimensional surface in the vicinity of the wireless device to produce the elementary dipole array representation of the wireless device.

14. The apparatus of claim 12, the NFES representation comprising the elementary dipole array representation of the wireless device.

15. The apparatus of claim 14, the elementary dipole array representation comprising parameters for a plurality of electric dipoles.

16. The apparatus of claim 14, the elementary dipole array representation comprising parameters for a plurality of magnetic dipoles.

17. The apparatus of claim 12, the memory further storing the phase components of the at least one component of the electric or magnetic field over the two-dimensional surface in the vicinity of the wireless device.

18. An apparatus comprising:

means for measuring the magnitude of at least one component of an electric or magnetic field over a two-dimensional surface in the vicinity of the wireless device; and means for deriving a near-field equivalent source representation of the wireless device based on the measured electric or magnetic field components, including:

means for producing an elementary dipole array representation of the wireless device; and means for validating the elementary dipole array representation with the at least one electric or magnetic field component, if the elementary dipole array representation does not correlate with the at least one electric or magnetic field component as determined by an accuracy metric, then the means for producing either increases the spatial resolution of the measuring or decreases the separation between the two-dimensional surface and the wireless device; and means for estimating the SAR at a location relative to the wireless device using the derived near-field equivalent source representation.

19. A method for estimating specific absorption rate (SAR) from a wireless device (WD), the method comprising:

measuring the magnitude of at least one component of an electric or magnetic field over a two-dimensional surface in the vicinity of the wireless device; and deriving a near-field equivalent source representation of the wireless device based on the measured electric or magnetic field components;

estimating the SAR or electric field data at a location relative to the wireless device using the derived near-field equivalent source representation, the estimating being made for a plurality of positions of the wireless device relative to a standard anthropomorphic model (SAM) including extracting two-dimensional (2D) or three-dimensional (3D) SAR or electric field data over a tissue simulating liquid volume in the SAM; and storing a set of basis SAR scans in a memory of the wireless device, each basis surface scan corresponding to an SAR or electric field scan of the wireless device given a specific exposure scenario wherein only one transmitter and one antenna are enabled.

20. The method of claim 19, further comprising constructing a combined SAR based on inputs comprising the stored set of basis surface scans for all active transmitters in a given real-time exposure scenario.

\* \* \* \* \*